US008477480B2

(12) United States Patent
Hayakawa et al.

(10) Patent No.: US 8,477,480 B2
(45) Date of Patent: Jul. 2, 2013

(54) LAMINATE, SEPARATOR FOR CAPACITOR, AND CAPACITOR

(75) Inventors: Tomohiro Hayakawa, Okayama (JP); Hideo Hayashi, Okayama (JP); Taketoshi Okuno, Tsukuba (JP); Nozomu Sugoh, Tsukuba (JP); Hideki Kamada, Okayama (JP); Hiroyuki Kawai, Osaka (JP); Shinya Inada, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 203 days.

(21) Appl. No.: 12/759,772

(22) Filed: Apr. 14, 2010

(65) Prior Publication Data
US 2010/0195270 A1    Aug. 5, 2010

Related U.S. Application Data

(63) Continuation of application No. PCT/JP2008/002849, filed on Oct. 9, 2008.

(30) Foreign Application Priority Data

Oct. 18, 2007   (JP) ................................. 2007-271124

(51) Int. Cl.
*H01G 2/10* (2006.01)
(52) U.S. Cl.
USPC ........................................................ 361/512
(58) Field of Classification Search
USPC ................................................. 361/503, 512
See application file for complete search history.

(56) References Cited

U.S. PATENT DOCUMENTS

| 6,310,763 | B1 | 10/2001 | Suhara et al. |
| 6,411,496 | B1 | 6/2002 | Suhara et al. |
| 7,170,739 | B1 * | 1/2007 | Arora et al. .................... 361/502 |
| 7,226,695 | B2 * | 6/2007 | Takeuchi et al. ............... 429/209 |
| 7,242,572 | B2 * | 7/2007 | Norton et al. ................. 361/502 |
| 2001/0005928 | A1 | 7/2001 | Kimura et al. |

(Continued)

FOREIGN PATENT DOCUMENTS

| JP | 09-129509 | 5/1997 |
| JP | 11-168033 | 6/1999 |

(Continued)

OTHER PUBLICATIONS

U.S. Appl. No. 12/517,840, filed Jun. 5, 2009, Hayakawa, et al.

(Continued)

*Primary Examiner* — Eric Thomas
(74) *Attorney, Agent, or Firm* — Oblon, Spivak, McClelland, Maier & Neustadt, L.L.P.

(57) ABSTRACT

Laminates including a nanofiber layer and a base layer, the nanofiber layer comprising polyamide filaments formed from a polyamide (a) and having an average fiber diameter of 10 to 1000 nm, and the base layer comprising fibers at least including polyamide fibers formed from a polyamide (a), where the polyamide (a) comprises a dicarboxylic acid unit and a diamine unit and where (i) the dicarboxylic acid unit comprising a terephthalic acid unit in the proportion of not lower than 60% by mole, and (ii) the diamine unit comprising at least one diamine unit selected from the group consisting of 1,9-nonanediamine unit and 2-methyl-1,8-octanediamine unit in the proportion of not lower than 60% by mole in total are provided, as well as separators for capacitors including the laminates.

11 Claims, 1 Drawing Sheet

U.S. PATENT DOCUMENTS

| | | |
|---|---|---|
| 2002/0004973 A1 | 1/2002 | Suhara et al. |
| 2002/0097548 A1 | 7/2002 | Suhara et al. |
| 2007/0232175 A1 | 10/2007 | Katayama et al. |
| 2007/0247785 A1 | 10/2007 | Kobayashi et al. |

FOREIGN PATENT DOCUMENTS

| | | |
|---|---|---|
| JP | 2000-040641 | 2/2000 |
| JP | 2001-068380 | 3/2001 |
| JP | 2001-185455 | 7/2001 |
| JP | 2002-151358 | 5/2002 |
| JP | 2004-342396 | 12/2004 |
| JP | 2005-159283 | 6/2005 |
| JP | 2006-135243 | 5/2006 |
| JP | 2007-150122 | 6/2007 |
| WO | 2006/035614 | 4/2006 |
| WO | 2006/049151 | 5/2006 |
| WO | 2007/105479 | 9/2007 |

OTHER PUBLICATIONS

Chinese Office Action issued Jun. 22, 2011, in Chinese Patent Application No. 200880111304.8 with partial English translation.

Office Action issued Oct. 26, 2011, in Chinese Patent Application No. 200880111304.8.

U.S. Appl. No. 13/414,030, filed Mar. 7, 2012, Hayakawa, et al.

Office Action issued Apr. 16, 2013, in Japanese Patent Application No. 2009-537906 (w/English translation).

* cited by examiner

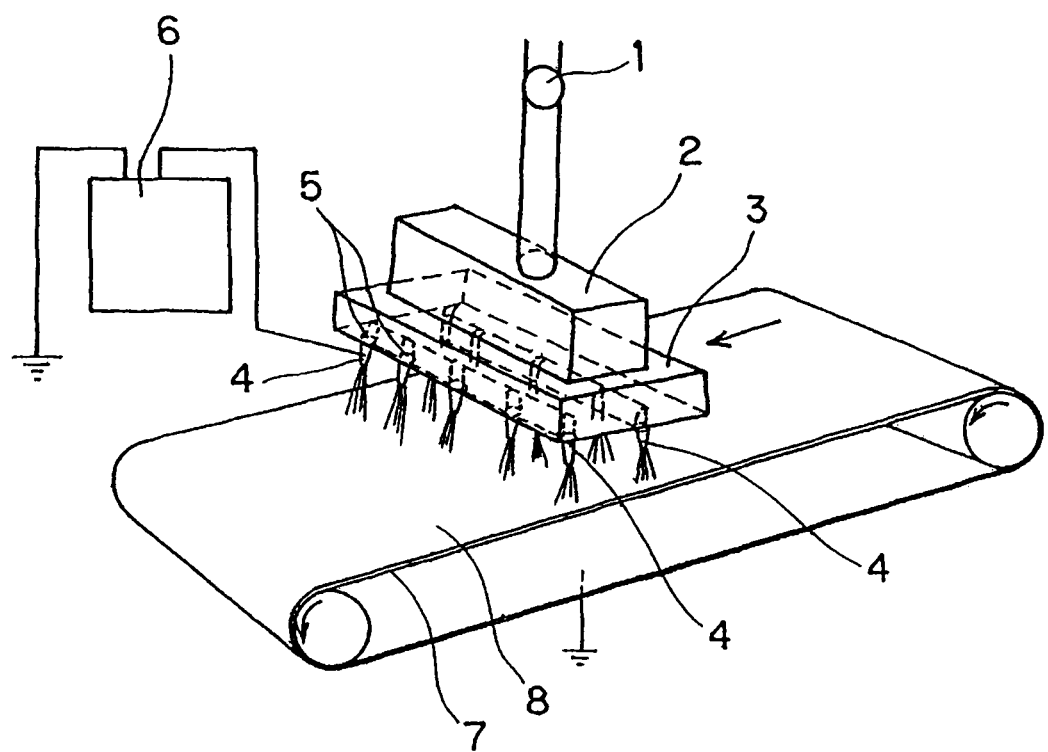

LAMINATE, SEPARATOR FOR CAPACITOR, AND CAPACITOR

CROSS REFERENCE TO RELATED APPLICATIONS

This application is a continuation application, under 35 U.S.C. §111(a), of the international application No. PCT/JP2008/002849, filed Oct. 9, 2008, which claims priority to Japanese Patent Application No. 2007-271124, filed Oct. 18, 2007, the disclosure of which is incorporated by reference in the entirety into this application.

FIELD OF THE INVENTION

The present invention relates to a laminate excellent in heat resistance, particularly in dimensional stability before and after heating and, more specifically, relates to a separator for capacitors and to a capacitor comprising such separator. In particular, the present invention relates to a separator suitable for use in an electric double layer capacitor that utilizes an organic electrolyte and to a capacitor comprising such separator.

BACKGROUND ART

Electric double layer capacitors have now come to be used not only in such major applications as power smoothing and noise absorption, for which the conventional capacitors (also referred to as condenser) are used, but also used as a supplement or alternative to a secondary battery and a power source for memory backup in a personal computer because the electric double layer capacitors have a large capacity comparable to NiCd batteries, nickel hydride batteries, and lithium ion batteries.

Although the conventional secondary battery has a large capacity, the lifetime thereof is relatively short and it is difficult to achieve quick charging and discharging thereof. In contrast thereto, the electric double layer capacitor has, in addition to the relatively large capacity, such good characteristics as a capability of quick charging and discharging and a long lifetime, which are prime advantages inherent in the capacitor.

The electric double layer capacitor generally comprises positive and negative electrodes, an electrolyte, a separator, and an electricity collecting plate, and the separator is used for the purpose of enhancing circulation of the electrolyte while avoiding a contact between the positive and negative electrodes. The separator is desired to have a small thickness since increase of the thickness of the separator results in increase of the path between the positive and negative electrodes, resulting in increase of the internal resistance. For this purpose, fibers forming the separator are desired to be extremely fine so as to reduce the thickness of the separator.

As an electrolyte in the capacitors, an aqueous electrolyte (e.g., an aqueous solution of sulfuric acid) or an organic electrolyte (e.g., a solution containing tetraethyl ammonium/tetrafluoroborate dissolved with propylene carbonate) is used, and the organic electrolyte has recently been highlighted because the electric decomposition voltage thereof is higher than that of water and enough to increase the energy density. With respect to the organic electrolyte, however, it is necessary to remove water as much as possible since water constitutes an impurity and tends to lower the capacitor performance. For this reason, the sufficient removal of water from the separator is generally carried out by drying the separator at a high temperature under a vacuum atmosphere. Therefore, the separator used in the capacitor of a kind using the organic electrolyte is desired to have a high heat resistance enough to withstand against the drying at high temperatures.

As for the separator used in the electric double layer capacitor, there have been known a separator comprising cellulose-series fibers (see the Patent Documents 1 to 3 listed below), a separator including a layer of an extremely fine polyacrylonitrile fiber web, the separator having a thickness of not greater than 25 μm in total (see the Patent Document 4 listed below), a separator for electric double layer capacitors comprising a nonwoven or woven fabric containing, as the subject fiber, sulfonated polyolefinic fibers to impart a hydrophilic property (see the Patent Document 5 listed below).

However, the separator prepared from the cellulose-series fibers has been found having insufficient heat resistance as it is easily discolored into a brown color when heated to a temperature of not lower than 150° C., and therefore the separator lowers the physical properties.

Moreover, the separator including the layer of the extremely fine polyacrylonitrile fiber web has been also found having an insufficient heat resistance because thermal shrinkage is apt to occur when it is heated.

Furthermore, even in the separator using the nonwoven or woven fabric containing sulfonated polyolefinic fibers, due to its insufficient heat resistance, the separator has been found not being suited for use in the electric double layer capacitor of a kind utilizing the organic electrolyte, in which water in the capacitor is generally required to be completely evaporated through drying at high temperatures.

In addition, there have been well-known separators for use in the electric double layer capacitor (see the Patent Documents 6 to 10 listed below); these separators are prepared from a wet-laid nonwoven fabric obtained by the wet paper making process using a sheet making material containing heat resistant fibrillated fibers and/or heat resistant short fibers.

Those separators have an improved heat resistance because they are prepared from the heat resistant fibrillated fibers and/or short fibers. However, of those prior art technologies, the separator of the wet-laid fabric comprising the refined fibrillated fibers and/or the short fibers has a small fineness and a too low porosity due to the wet paper making process, and, therefore, not only does the electrolyte pass insufficiently, but the internal resistance tends to increase, when such separator is used in the capacitor. As a result, the capacitor sometimes fails to perform smooth and stable charging and discharging. On the other hand, the separator obtained by the wet paper making process and comprising conventional short fibers having an average fiber diameter of micrometers or approximating thereto has been found having too large pores and, accordingly, not only does a substantial amount of electric current tend to leak, but also short-circuiting tends to occur because when such separator is used in a capacitor, electrode materials detached from the positive and/or negative electrodes may pass through the separator.

Patent Document 1: Japanese Laid-open Patent Publication No. 9-129509
Patent Document 2: Japanese Laid-open Patent Publication No. 11-168033
Patent Document 3: Japanese Laid-open Patent Publication No. 2000-40641
Patent Document 4: International Publication Pamphlet No. WO2006/049151
Patent Document 5: Japanese Laid-open Patent Publication No. 2001-68380
Patent Document 6: Japanese Laid-open Patent Publication No. 2001-185455

Patent Document 7: Japanese Laid-open Patent Publication No. 2002-151358

Patent Document 8: Japanese Laid-open Patent Publication No. 2005-159283

Patent Document 9: Japanese Laid-open Patent Publication No. 2006-135243

Patent Document 10: Japanese Laid-open Patent Publication No. 2007-150122

DISCLOSURE OF THE INVENTION

Problems to be Solved by the Invention

An object of the present invention is to provide a laminate excellent in heat resistance and resistant to reduction in physical property or performance even when it is heated during drying step or processing.

Also, an object of the present invention is to provide a laminate, which in addition to the above described excellent physical property, is excellent not only in efficiency of collecting fine particles, but in chemical resistance and durability.

Moreover, an object of the present invention is to provide a separator for capacitors, which in addition to the above described physical properties, is excellent in shielding property thereof from electrode materials detached from the positive and/or negative electrodes and excellent in capability of passing the electrolyte therethrough.

Furthermore, an object of the present invention is to provide a separator for capacitors, which in addition to the above described physical properties, excellent in mechanical properties such as strength, durability, and handleability.

Yet, an object of the present invention is to provide a capacitor comprising the separator having the previously described excellent physical properties. The capacitor is resistant to generation of leakage current and short-circuiting and, at the same time, is excellent in capability of passing the electrolyte therethrough, and further has a low internal resistance and is capable of accomplishing smooth and stable charging and discharging.

Means for Solving the Problems

The inventors of the present invention have conducted a series of extensive studies in an attempt to accomplish those aforesaid objects of the present invention. As a result thereof, the inventors have found that in place of the conventional technology in which a wet-laid sheet comprising fibrillated fibers and/or short fibers (or staple fibers) is singly used as a separator for capacitors, if a nanofiber layer and a base layer are combined to provide a laminate and both the nanofiber layer and the base layer include a specific kind of polyamide, the resultant product has an excellent heat resistance and is resistant to reduction in the property or performance caused by heating during drying or processing, and further found that when a separator for capacitors comprises the resultant laminate, micropores are uniformly distributed over the entire nanofiber layer to such an extent that the resultant product comes to be excellent in property of shielding the electrode materials detached from the positive and/or negative electrodes and, at the same time, the resultant product is also excellent in passing the electrolyte due to a high porosity thereof.

Furthermore, the inventors of the present invention have found that the laminate so obtained and the separator for capacitors comprising the laminate are free from interlayer separation because of a high bonding strength between the nanofiber layer and the base layer, and excellent in mechanical properties, durability and handleability and that the capacitor using the laminate so obtained is resistant to leakage current and short-circuiting because of an excellent shielding performance of the laminate in shielding the electrode materials detached from the positive and/or negative electrodes. At the same time, the capacitor is excellent in property of passing the electrolyte therethrough due to a high porosity, and thereby having a low internal resistance and being capable of accomplishing smooth and stable charging and discharging. Those findings have now led to the present invention.

That is, the present invention provides a separator for capacitors comprising a laminate comprising a nanofiber layer and a base layer, the laminate at least comprising the nanofiber layer on one surface or both surfaces thereof;

the nanofiber layer comprising polyamide filaments formed from a polyamide (a) and having an average fiber diameter of 10 to 600 nm, and the base layer comprising fibers at least including polyamide fibers formed from a polyamide (a); and the polyamide (a) comprising a dicarboxylic acid unit and a diamine unit, (i) the dicarboxylic acid unit comprising terephthalic acid unit in the proportion of not lower than 60% by mole, and (ii) the diamine unit comprising at least one diamine unit selected from the group consisting of 1,9-nonanediamine unit and 2-methyl-1,8-octanediamine unit in the proportion of not lower than 60% by mole in total.

The laminate may have a peeling strength between the nanofiber layer and the base layer of about 5 to 100 g/30 mm, and the base layer may comprise mixed fibers of the polyamide (a) fibers and polyamide binder fibers. That is, the base layer may comprise the polyamide (a) fibers comprising the polyamide (a) and polyamide (ab) fibers formed from a polyamide (ab) including a polyamide (a) and a polyamide (b), the polyamide (b) comprising a dicarboxylic acid unit and a diamine unit, (i) the dicarboxylic acid unit comprising at least one dicarboxylic acid unit selected from the group consisting of terephthalic acid unit and isophthalic acid unit in the proportion of not lower than 60% by mole in total, (ii) the diamine unit comprising at least one diamine unit selected from the group consisting of 2,2,4-trimethylhexanediamine unit, to 2,4,4-trimethylhexanediamine unit and 1,6-hexanediamine unit in the proportion of not lower than 60% by mole in total.

Moreover, in the separator, the nanofiber layer may have a porosity of about 65% to 95%, and the fibers constituting the base layer may have a single-fiber fineness of about 0.01 to 5 dtex. Further, the ratio of the base layer thickness to the nanofiber layer thickness may be about 0.8:1 to 3.5:1.

In the separator, the nanofiber layer comprising the polyamide filaments formed from a polyamide (a) and having an average fiber diameter of 10 to 600 nm may be laminated on the base layer using an electro-spinning process with a solution of the polyamide (a) dissolved in an organic solvent or with a molten liquid of the polyamide (a).

In addition, the present invention also provides a capacitor (e.g., electric double layer capacitors) using the separator.

Further, the present invention also provides a heat-resistant laminate comprising a nanofiber layer and a base layer, the laminate at least comprising the nanofiber layer on one surface or both surfaces thereof. In the heat-resistant laminate, the nanofiber layer comprises polyamide filaments formed from a polyamide (a) and having an average fiber diameter of 10 to 1000 nm and the base layer comprises fibers at least including polyamide fibers formed from a polyamide (a); and the polyamide (a) comprising a dicarboxylic acid unit and a diamine unit;

(i) the dicarboxylic acid unit comprising terephthalic acid unit in the proportion of not lower than 60% by mole, and (ii) the diamine unit comprising at least one diamine unit selected from the group consisting of 1,9-nonanediamine unit and 2-methyl-1,8-octanediamine unit in the proportion of not lower than 60% by mole in total.

Since the laminate is excellent in heat resistance, the laminate may have a rate of dimensional change of less than 2.5% when the rate is measured before and after heating in a dryer kept at a temperature of 200° C. under a vacuum atmosphere for 24 hours.

Effect of the Invention

The laminate of the present invention is excellent in heat resistance and is resistant to reduction in property or performance caused by heating during drying or processing, as well as by external heating when used. Further, not only are the micropores uniformly distributed over the entire nanofiber layer, but also the nanofiber layer has a high porosity, thereby the laminate being excellent in collecting property of fine particles (e.g., powder dusts, electrode materials). Furthermore, the laminate has enough bonding strength between the nanofiber layer and the base layer to avoid interlayer separation, and is excellent in mechanical properties, durability, and handleability.

Further, the separator for capacitors comprising the laminate of the present invention has a nanofiber layer having micropores uniformly distributed over the entire nanofiber layer, thereby excellent in shielding property thereof from electrode materials detached from the positive and/or negative electrodes, while having a high porosity and being excellent in property of passing the electrolyte therethrough.

Furthermore, since the capacitor comprising the separator of the present invention has an excellent shielding property thereof from electrode materials detached from the positive and/or negative electrodes, the capacitor is resistant to generation of leakage current and short-circuiting, while having a low internal resistance and performing smooth and stable charging and discharging due to the high porosity and excellent passing property of the electrolyte therethrough.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

FIG. 1 is a schematic diagram showing one of the embodiments of an electro-spinning machine preferably utilized for producing a laminate comprising a nanofiber layer and a base layer, the laminate constituting a separator for capacitors of one embodiment of the present invention.

BEST MODE FOR CARRYING OUT THE INVENTION

Hereinafter an embodiment of the present invention will now be described in more detail. The laminate of the present invention is a laminate comprising a nanofiber layer and a base layer, and the laminate comprises the nanofiber layer on one surface or both surfaces of the laminate (in other words, the nanofiber layer is placed on one surface or both surfaces of the laminate). The laminate of the present invention is excellent in heat resistance and/or in removal performance of fine particles, and therefore the laminate is suitably utilized for separators for capacitors (hereinafter sometimes simply referred to as "separators") or filters.

[Nanofiber Layer]

The nanofiber layer in the laminate of the present invention comprises semiaromatic polyamide filaments having an average fiber diameter (average single-fiber diameter) on a nanoscale [hereinafter, the polyamide filament formed from a polyamide (a) and having an average fiber diameter on a nanoscale is sometimes referred to as "polyamide (a) nanofilament".]

(Polyamide (a) Nanofilaments)

In view of improving removal efficiency of fine particles, the polyamide (a) nanofilaments for the nanofiber layer has an average fiber diameter of 10 to 1000 nm (preferably about 10 to 600 nm, more preferably about 40 to 550 nm, further preferably about 50 to 450 nm). In the case where the nanofiber layer is formed from the filaments having an average fiber diameter of larger than 1000 nm, the pore size of the layer enlarges and may result in reducing removal efficiency of fine particles. On the other hand, the filaments having an average fiber diameter of smaller than 10 nm cannot be used for stable production of the laminate due to their poor processability.

In particular, in the laminate for separators, the polyamide (a) nanofilaments constituting the nanofiber layer have an average fiber diameter of about 10 to 600 nm. In the case where the nanofilament has an average fiber diameter of larger than 600 nm, the nanofiber layer has larger pore sizes therein, and the layer may reduce shielding property thereof from electrode materials and others. The capacitor using such laminate generates a larger leakage current and is undesirable because of deterioration in capacitor performance.

Considering the achievement both in shielding property as a separator and in productivity for producing a laminate for separators, the polyamide (a) nanofilament preferably has an average fiber diameter of 40 to 500 nm, and more preferably 100 to 400 nm.

It should be noted that the "average fiber diameter" of the filaments in this specification means an average single-fiber diameter obtained in the manner described in the below-mentioned EXAMPLES.

(Polyamide (a))

The polyamide (a) constituting the polyamide (a) nanofilaments is a polyamide comprising a dicarboxylic acid unit and a diamine unit, the dicarboxylic acid unit comprising terephthalic acid unit in the proportion of not lower than 60% by mole, and the diamine unit comprising 1,9-nonanediamine unit and/or 2-methyl-1,8-octanediamine unit in the proportion of not lower than 60% by mole in total (in other words, at least one diamine unit selected from the group consisting of 1,9-nonanediamine unit and 2-methyl-1,8-octanediamine unit in the proportion of not lower than 60% by mole in total). By using such a specific polyamide (a), even if nanofilaments have a small average fiber diameter, the nanofiber layer comprising the nanofilaments can accomplish excellent heat resistance, and further chemical resistance.

Further, not only does a separator comprising a laminate including the polyamide nanofiber layer have an excellent heat resistance, but also it achieves good electrolyte resistance because the nanofiber layer is resistant to corrosion by electrolytes.

In the case where the proportion of terephthalic acid unit in the total dicarboxylic acid units of polyamide (a) is lower than 60% by mole, the laminate comprising such polyamide may be insufficient in heat resistance, and further the separator comprising the laminate is also in some characteristics, such as, heat resistance and electrolyte resistance.

In the polyamide (a), from the viewpoint of improvement in heat resistance, chemical resistance (e.g., electrolyte resistance), and others, the proportion of terephthalic acid unit in the total dicarboxylic acid units of polyamide (a) is preferably not lower than 70% by mole, and more preferably not lower than 80% by mole, and further preferably 90% to 100% by mole.

In the case where polyamide (a) has other dicarboxylic acid unit(s) in combination with terephthalic acid unit, examples of other dicarboxylic acid unit may include dicarboxylic acid units derived from, for example, aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxane-diacetic acid, 1,3-phenylenedioxanediacetic acid, diphenic acid, dibenzoic acid 4,4'-oxydibenzoic acid, diphenylmethane-4,4'-dicarboxylic acid, diphenylsulfone-4,4'-dicarboxylic acid and 4,4'-biphenyldicarboxylic acid; aliphatic dicarboxylic acids such as malonic acid, dimethylmalonic acid, succinic acid, 3,3-diethylsuccinic acid, glutaric acid, 2,2-dimethylglutaric acid, adipic acid, 2-methyladipic acid, trimethyladipic acid, pimellic acid, azelaic acid, sebacic acid and suberic acid; alicyclic dicarboxylic acids such as 1,3-cyclopentanedicarboxylic acid and 1,4-cyclohexanedicarboxylic acid. The polyamide may comprise the above dicarboxylic acid unit(s) singly or in combination of two or more.

If necessary, the polyamide (a) may further comprise structural units derived from polybasic carboxylic acids such as trimellitic acid, trimesic acid and pyromellitic acid as long as the polyamide (a) can be used for forming the nanofilament as described above.

Among them, in view of improved heat resistance and/or electrolyte resistance and others in separators, the proportion of the aromatic dicarboxylic acid unit in the total dicarboxylic acid units is preferably not lower than 75% by mole, especially preferably 100% by mole.

If the polyamide has 1,9-nonanediamine unit and/or 2-methyl-1,8-octanediamine unit in a proportion (if the polyamide comprises both 1,9-nonanediamine unit and 2-methyl-1,8-octanediamine unit, the total amount of both units is adopted) of lower than 60% by mole based on the total amount of diamine units, such polyamide generally fails to achieve heat resistance, chemical resistance (e.g., electrolyte resistance), and others.

From the above-mentioned viewpoints, in order to improve heat resistance and electrolyte resistance of the polyamide (a), the polyamide (a) comprises 1,9-nonanediamine unit and/or 2-methyl-1,8-octanediamine unit in total in the proportion of not lower than 60% by mole, and preferably not lower than 70% by mole, and more preferably not lower than 80% by mole, and further preferably not lower than 90% to 100% by mole, based on the total amount of diamine units.

The polyamide (a) may comprise, as the diamine units, only 1,9-nonanediamine unit or only 2-methyl-1,8-octanediamine unit, but preferably comprises both 1,9-nonanediamine unit and 2-methyl-1,8-octanediamine unit. In particular, from the viewpoint of heat resistance, the molar ratio of 1,9-nonanediamine unit to 2-methyl-1,8-octanediamine unit, i.e., (1,9-nonanediamine unit):(2-methyl-1,8-octanediamine unit) may be preferably 30:70 to 99:1, and particularly preferably 40:60 to 95:5.

In the case where polyamide (a) has other diamine unit(s) in combination with 1,9-nonanediamine unit and/or 2-methyl-1,8-octanediamine unit, examples of other diamine unit may include diamine units derived from, for example, alkylenediamines having 6 to 12 carbon atoms other than 1,9-nonanediamine and 2-methyl-1,8-octanediamine units, specifically alkylenediamines having 6 to 12 carbon atoms such as 1,6-hexanediamine, 1,8-octanediamine, 1,10-decanediamine, 1,11-undecanediamine, 1,12-dodecanediamine, 2-methyl-1,5-pentanediamine, 3-methyl-1,5-pentanediamine, 2,2,4-trimethyl-1,6-hexanediamine, 2,4,4-trimethyl-1,6-hexanediamine, and 5-methyl-1,9-nonanediamine; diamines other than above-mentioned alkylenediamines having 6 to 12 carbon atoms, specifically aliphatic diamines such as ethylenediamine and 1,4-butanediamine; alicyclic diamines such as cyclohexanediamines, methylcyclohexanediamines, isophoronediamines, and norbornanedimethyldiamines, tricyclodecanedimethyldiamines; aromatic diamines such as p-phenylenediamines, m-phenylenediamines, xylylenediamines, xylenediamines, 4,4'-diaminodiphenylmethane, 4,4'-diaminodiphenylsulfone, and 4,4'-diaminodiphenyl ether. The polyamide may comprise the diamine unit(s) singly or in combination of two or more.

From the viewpoint of heat resistance, the polyamide (a) preferably comprises an alkylenediamine having 6 to 12 carbon atoms including 1,9-nonanediamine unit and 2-methyl-1,8-octanediamine unit in the proportion of not lower than 75% by mole, and particularly preferably not lower than 90% by mole, based on the total amount of diamine units.

Moreover, in the polyamide (a), the molar ratio of amide unit (—CONH—) relative to methylene unit (—$CH_2$—) in the polyamide molecular chain, i.e., [(—CONH—)/(—$CH_2$—)] is preferably in the range of 1/2 to 1/8, particularly preferably of 1/3 to 1/5. In the case where the molar ratio of the amide unit relative to the methylene unit in the polyamide (a) is within the above range, the polyamide (a) can impart to laminates comprising the polyamide (a) excellent heat resistance, and the laminates can impart to separators comprising those laminates excellent electrolyte resistance and heat resistance.

The polyamide (a) preferably has an intrinsic viscosity (value measured in concentrated sulfuric acid at 30° C.) of 0.6 to 2 dl/g, more preferably 0.6 to 1.8 dl/g, and further preferably 0.7 to 1.6 dl/g. The polyamides (a) having an intrinsic viscosity within the above range has a good melt-viscosity property and is suitable for fiber spinning. As a result, even if laminates comprises nanofiber layer(s), the laminates excel in strength and/or heat resistance, and further separators comprising such laminates have improved strength, electrolyte resistance, and heat resistance.

It should be noted that the intrinsic viscosity of polyamide, in the specification, denotes the value obtained in the manner described in the below-mentioned EXAMPLES.

Moreover, the polyamide (a) is preferably capped its chain ends by an end-capping agent in the proportion of not lower than 10%, more preferably not lower than 40%, and further preferably not lower than 70% based on total ends of polymer chains. The polyamide (a) having capped chain ends in the above proportion can exert excellent properties such as strength, electrolyte resistance and heat resistance to separators.

The end-capping agent is not particularly limited to a specific one as long as the agent is a monofunctional compound reactive with terminal amino or carboxyl group in polyamide molecules. In view of reactivity and stability of the capped chain ends, monocarboxylic acids and monoamines are preferably used as the end-capping agent. Further, from the viewpoint of handleability, reactivity, stability of the capped chain ends, and cost, monocarboxylic acids are preferable end-capping agents. Examples of such monocarboxylic acids may include acetic acid, propionic acid, butyric acid, valeric acid, caproic acid, caprylic acid, lauric acid, tridecylic acid, myristic acid, palmitic acid, stearic acid, benzoic acid, and the like. It should be noted that the percentage of capped end groups in the polyamide can be determined from the integral value of property signals corresponding to each of the end groups by using $^1$H-NMR spectroscopy.

In the laminate of the present invention, the nanofiber layer preferably has a thickness of 3 to 30 µm, more preferably 5 to 27 µm, and further preferably 7 to 25 µm in order to impart to the laminate an improved balance between efficiency of collecting fine particles and sufficient gas or liquid permeability. The laminates comprising the nanofiber layer having a thickness of within such a range can attribute to thinning of separators comprising the laminates and to increasing the volume to be filled with electrode materials in capacitors comprising the separator. As a result, capacitors comprising the separators can enhance the amount of the filled electrode materials in the capacitors, thereby improving the capacitor performance.

Further, in order to strike a good balance between gas or liquid permeability and efficiency of collecting fine particles, the nanofiber layer may have a basis weight of preferably 0.1 to 10 $g/m^2$, more preferably 0.2 to 5 $g/m^2$. The laminates comprising the nanofiber layer having a basis weight of within such a range can reduce internal resistance of separators comprising the laminate and can also improve shielding property thereof from electrode materials, and other properties.

Further, the nanofiber layer may have a density (bulk density) of preferably 0.08 to 0.5 $g/cm^3$, more preferably 0.1 to 0.45 $g/cm^3$, and further preferably 0.14 to 0.4 $g/cm^3$ to ensure to both the laminates and the separators good gas or liquid permeability, reduced internal resistance, efficiency of collecting fine particles, shielding property thereof from electrode materials or the like.

In view of enhancing efficiency of collecting fine particles, the nanofiber layers comprising polyamide (a) nanofilaments preferably has a porosity of 50 to 95%, and more preferably 60 to 93%. The nanofiber layers having a porosity of within the above range can enlarge the contact area with fine particles, thereby collecting fine particles efficiently.

Moreover, in particular, in the case where the laminates are used as separators, the nanofiber layer comprising polyamide (a) nanofilaments may have a porosity of preferably 65 to 95%, and more preferably 70 to 90% to accomplish smooth pass of electrolytes and reduced internal resistance of separators used in capacitors. When the nanofiber layers having a porosity of lower than 65% are utilized as separators, the separators may cause a high internal resistance and deteriorate in smooth pass of electrolyte, resulting in deterioration of capacitor performance. In contrast thereto, the nanofiber layer having a porosity of higher than 95% may reduce shielding property thereof from electrode materials due to too high porosity, resulting in generation of leakage current in capacitors with a high possibility. As a result, such capacitors may deteriorate in capacitor performance.

In the conventional separators, even prepared by a wet paper making process using sheet-making-materials including highly fibrillated fibers or short fibers having a small fineness, the separators fail to accomplish a high porosity (e.g., not lower than 65%), and resulting in higher internal resistance. Accordingly, capacitors comprising such conventional separators cannot smoothly pass the electrolyte therethrough, and have difficulty in performing smooth and stable charging and discharging. In contrast thereto, in the separator of the present invention, the nanofiber layer for functioning as a shielding layer of electrode materials is not produced by the wet paper making process using fibrillated fibers or short fibers having a small fineness, but is a layer (nonwoven web) produced by depositing (accumulating) polyamide (a) nanofilaments having an average fiber diameter of 10 to 600 nm. Accordingly, the nanofiber layer can accomplish such high porosity of 65 to 95%.

It should be noted that the "porosity" in this specification means a porosity obtained in the manner described in the below-mentioned EXAMPLES The nanofiber layer having the above mentioned properties and comprising polyamide (a) nanofilaments having an average fiber diameter of 10 to 1000 nm (particularly 10 to 600 nm) can be formed smoothly by performing an electro-spinning process with a solution of a polyamide (a) in an organic solvent or a molten liquid of a polyamide (a) as described below and by laminating (depositing) the polyamide (a) nanofilament layer in the form of a nonwoven web on a base layer.

[Base Layer]

Turning now to a base layer in the laminate of the present invention, the base layer comprises fibers at least comprising a polyamide fiber formed from a polyamide (a), and the polyamide (a) comprises a dicarboxylic acid unit and a diamine unit, the dicarboxylic acid unit comprising terephthalic acid unit in the proportion of not lower than 60% by mole, and the diamine unit comprising 1,9-nonanediamine unit and/or 2-methyl-1,8-octanediamine unit in the proportion of not lower than 60% by mole.

(Polyamide (a) Fiber)

The base layer comprises a "polyamide fiber formed from a to polyamide (a)" (hereinafter sometimes referred to as a "polyamide (a) fiber"). The polyamide (a) is a polyamide belonging in the same group as the polyamide (a) constituting the polyamide (a) nanofilaments of the nanofiber layer.

The polyamide (a) fiber constituting the base layer may comprise the same polyamide as the polyamide (a) constituting the polyamide (a) nanofilament, or may comprise another polyamide different from the polyamide (a) constituting the polyamide (a) nanofilament but still belonging to the polyamide (a) group.

In the laminate (e.g., laminates used as separators) of the present invention, the laminate comprises a nanofiber layer formed from polyamide (a) nanofilaments and a base layer formed from fibers at least including a polyamide (a) fiber. In other words, when the nanofiber layer and the base layer are made from the same or similar polyamide, the nanofiber layer adheres strongly to the base layer. As a result, there is little possibility to occur a slippage between the nanofiber layer and the base layer, thereby the laminate being excellent in mechanical property, durability and handleability.

Further, if a separator comprising the laminate is used for capacitors, the capacitors are resistant to generation of leakage current caused by contact between the nanofiber layer and the base layer due to slipping of these layers.

Since the laminate of the present invention comprises a base layer and a nanofiber layer laminated to the base layer, wherein the nanofiber layer comprises polyamide (a) nanofilaments and the base layer comprises fibers including a polyamide (a) fiber, the laminate usually has a great peeling strength of not lower than 5 g/30 mm. The laminate of the present invention preferably has a peeling strength of 5 to 100 g/30 mm, more preferably 7.5 to 75 g/30 mm, and further preferably 10 to 50 g/30 mm.

It should be noted that the peeling strength in this specification means a peeling strength obtained in the manner described in the below-mentioned EXAMPLES.

The laminate having such a peeling strength has a tight integration between the nanofiber layer and the base layer. Therefore, not only can the laminate be excellent in durability, but also it can strike a good balance between gas or liquid permeability and efficiency of collecting fine particles.

Incidentally, some laminates having a peeling strength of over 100 g/30 mm may contain a large amount of adhesive components in order to exert a high peeling strength, but the pores in such laminates may be sealed with the adhesive components. Accordingly, the maximum peeling strength of the laminate is preferably 100 g/30 mm. In particular, in the case where the laminate is used as separators, the maximum peeling strength of the laminate is preferably 100 g/30 mm from the viewpoint of preventing the separators from having high internal resistance.

The above-mentioned peeling strength can be accomplished by adhering a nanofiber layer to a base layer with a known or commonly used adhesive agent. Further, the peeling strength between nanofiber layer and base layer can be also enhanced, without addition of an adhesive agent, by forming the base layer from mixed fibers of polyamide (a) fibers and polyamide binder fibers having adhesive property.

The base layer may comprise polyamide (a) fibers alone, but the base layer preferably comprises mixed fibers of polyamide (a) fibers and polyamide binder fibers (polyamide (ab) fibers) mentioned below, in order to obtain separators more excellent in mechanical property, durability and handleability, and being resistant to development of the slippage between the nanofiber layer and the base layer which may lead to generation of leakage current. Such separators can be accomplished by enhancing the adhesion between the nanofiber layer and the base layer as well as the bondability (bonding strength) between the fibers forming the base layer.

In general, thermobondability (thermal adhesion property) is incompatible with heat resistance in substance. However, in the laminate comprising a specific base layer and a specific nanofiber layer, not only is the base layer formed from mixed fibers of a polyamide (a) fiber and a polyamide (ab) fiber, but also the base layer is combined with a nanofiber layer comprising a polyamide (a) fiber. As a result, not only can the nanofiber layer be laminated on the base layer by heat-bonding (thermobonding), but also thus obtained laminate can achieve excellent heat resistance.

In particular, the base layer comprising mixed fibers of a polyamide (a) fiber and a polyamide (ab) blend fiber can facilitate production of separators having high bonding strength of 5 to 100 g/30 mm as mentioned above.

(Polyamide (ab) Blend Fiber)

The polyamide binder fiber [hereinafter sometimes referred to as "polyamide blend (ab) fiber"] used as a binder component is a fiber formed from a polyamide blend (polyamide composition) [hereinafter sometimes referred to as "polyamide blend (ab)"] comprising the above-mentioned polyamide (a) and a polyamide (b) in combination.

(Polyamide (a))

As mentioned above, the polyamide (a) is a polyamide comprising a dicarboxylic acid unit and a diamine unit, wherein the dicarboxylic acid unit comprises terephthalic acid unit in the proportion of not lower than 60% by mole, and the diamine unit comprises 1,9-nonanediamine unit and/or 2-methyl-1,8-octanediamine unit in the proportion of not lower than 60% by mole in total.

(Polyamide (b))

The polyamide (b) is a polyamide comprising a dicarboxylic acid unit and a diamine unit. The dicarboxylic acid unit comprises terephthalic acid unit and/or isophthalic acid unit in the proportion of not lower than 60% by mole (i.e., the dicarboxylic acid unit comprising at least one dicarboxylic acid unit selected from the group consisting of terephthalic acid unit and isophthalic acid unit in the proportion of not lower than 60% by mole in total), and the diamine unit comprises at least one diamine unit selected from the group consisting of 2,2,4-trimethylhexanediamine unit, 2,4,4-trimethylhexanediamine unit and 1,6-hexanediamine unit in the proportion of not lower than 60% by mole in total.

The polyamide (b) comprises terephthalic acid unit and/or isophthalic acid unit in the proportion of not lower than 60% by mole in total based on total dicarboxylic acid units. In the case where the proportion of terephthalic acid unit and/or isophthalic acid unit in the total dicarboxylic acid units of polyamide (b) is lower than 60% by mole, the laminate comprising such polyamide may have a reduced bondability, and further the separator comprising the laminate may also have a lowered electrolyte resistance.

In view of bondability of polyamide (ab) blend fiber and electrolyte resistance of separators, the polyamide (b) preferably comprises terephthalic acid unit and/or isophthalic acid unit in the proportion of not lower than 70% by mole, more preferably not lower than 80% by mole, and further preferably 90% to 100% by mole, based on the total dicarboxylic acid units.

In the case where polyamide (b) includes other dicarboxylic acid unit(s) in combination with terephthalic acid unit and/or isophthalic acid unit, examples of other dicarboxylic acid unit may include dicarboxylic acid units derived from, for example, aromatic dicarboxylic acids such as 2,6-naphthalenedicarboxylic acid, 2,7-naphthalenedicarboxylic acid, 1,4-naphthalenedicarboxylic acid, 1,4-phenylenedioxanediacetic acid, 1,3-phenylenedioxanediacetic acid, diphenic acid, dibenzoic acid 4,4'-oxydibenzoic acid, diphenylmethane-4,4'-dicarboxylic acid, diphenylsulfone-4,4'-dicarboxylic acid and 4,4'-biphenyldicarboxylic acid; aliphatic dicarboxylic acids such as malonic acid, dimethylmalonic acid, succinic acid, 3,3-diethylsuccinic acid, glutaric acid, 2,2-dimethylglutaric acid, adipic acid, 2-methyladipic acid, trimethyladipic acid, pimellic acid, azelaic acid, sebacic acid and suberic acid; alicyclic dicarboxylic acids such as 1,3-cyclopentanedicarboxylic acid and 1,4-cyclohexanedicarboxylic acid. The polyamide may comprise the dicarboxylic acid unit(s) singly or in combination of two or more.

From the viewpoint of striking a good balance between heat resistance and integration of the laminate, the polyamide (b) preferably comprises terephthalic acid unit and/or isophthalic acid unit in the proportion of 100% by mole, based on the total dicarboxylic acid units. Moreover, the molar ratio of terephthalic acid unit relative to isophthalic acid unit, i.e., (terephthalic acid unit):(isophthalic acid unit) in the molecular chain of polyamide (b) can be in the range of 100:0 to 0:100, and particularly preferably 70:30 to 50:50. In particular, separators comprising such laminates are excellent in strength, chemical resistance, electrolyte resistance, oxidation resistance, and the like.

The polyamide (b) preferably has at least one diamine unit selected from the group consisting of 2,2,4-trimethylhexanediamine unit, 2,4,4-trimethylhexanediamine unit and 1,6-hexanediamine unit in the proportion of not lower than 60% by mole in total, preferably not lower than 70% by mole, more preferably not lower than 80% by mole, and further preferably 100% by mole, based on the total diamine units in view of bondability.

In the case where the proportion of at least one diamine unit selected from the group consisting of 2,2,4-trimethylhexanediamine unit, 2,4,4-trimethylhexanediamine unit and 1,6-hexanediamine unit in the polyamide (b) is too low, the polyamide may reduce its bondability, resulting in deterioration in properties such as electrolyte resistance, or strength in separators comprising the laminate.

In the polyamide (b) comprising at least one diamine unit selected from the group consisting of 2,2,4-trimethylhexanediamine unit, 2,4,4-trimethylhexanediamine unit and 1,6-hexanediamine unit in the proportion of not lower than 60% by mole in total, the molar ratio of [1,6-hexanediamine unit] relative to [total mole of 1,9-nonanediamine unit and 2-methyl-1,8-octanediamine unit] is preferably in the range of 100:0 to 50:50, and particularly preferably 100:0 to 60:40. In the case where the polyamide (b) comprises both 1,9-nonanediamine unit and 2-methyl-1,8-octanediamine unit, the molar ratio of [1,9-nonanediamine unit] relative to [2-methyl-1,8-octanediamine unit] is preferably in the range of 99:1 to 40:60, and particularly preferably 90:10 to 45:55. The polyamide (b) having a diamine unit in the molar ratio of the above range can impart to polyamide (ab) blend fiber good balance between bondability and dispersibility.

Further, in the polyamide (b), the molar ratio of amide unit (—CONH—) relative to methylene unit (—CH$_2$—) in the polyamide molecular chain, i.e., [(—CONH—)/(—CH$_2$—)] is preferably in the range of 1/2 to 1/8, particularly preferably 1/3 to 1/5. If the molar ratio of the amide unit relative to the methylene unit in the polyamide (b) is within the above range, laminates comprising the polyamide (b) have excellent heat resistance as well as chemical resistance, and in particular, separators comprising the laminate excel in electrolyte resistance and heat resistance.

The polyamide (b) preferably has an intrinsic viscosity (value measured in concentrated sulfuric acid at 30° C.) of 0.6 to 2.5 dl/g, more preferably 0.7 to 2 dl/g, and further preferably 0.8 to 1.7 dl/g. The polyamide (b) having an intrinsic viscosity within the above range can exert good melt-viscosity property suitable for fiber spinning. The polyamide (b) is excellent in spinnability as well as can impart to laminates improved heat resistance and chemical resistance. As a result, separators comprising such laminate have excellent strength, electrolyte resistance, and heat resistance.

Moreover, the polyamide (b) is preferably capped its chain ends by an end-capping agent in the proportion of not lower than 10%, more preferably not lower than 40%, and further preferably not lower than 70% based on total ends of polymer chains. The polyamide (b) having capped chain ends in the above proportion can impart to laminates excellent properties such as heat resistance and chemical resistance, and particularly to separators strength, electrolyte resistance, heat resistance, and others.

The end-capping agent is not particularly limited to a specific one as long as the agent is a monofunctional compound reactive with terminal amino or carboxyl group in polyamide molecules. In view of reactivity and stability of the capped chain ends, monocarboxylic acids and monoamines are preferably used as the end-capping agent. Further, from the viewpoint of handleability, reactivity, stability of the capped chain ends, and cost, monocarboxylic acids are preferable end-capping agents. Examples of such monocarboxylic acids may include acetic acid, propionic acid, butyric acid, valeric acid, caproic acid, caprylic acid, lauric acid, tridecylic acid, myristic acid, palmitic acid, stearic acid, benzoic acid, and the like.

It should be noted that the percentage of capped end groups in the polyamide can be determined from the integral value of characteristic signals corresponding to each of the end groups by using $^1$H-NMR spectroscopy.

The blend ratio of polyamide (a) relative to polyamide (b), i.e., [polyamide (a)]:[polyamide (b)], in the polyamide blend (ab) for preparing polyamide (ab) blend fibers is, by mass ratio, preferably 10:90 to 90:10, more preferably 15:85 to 70:30, and further preferably 20:80 to 40:60. The polyamide comprising polyamide (a) and polyamide (b) in the blend ratio of the above range can contribute to forming polyamide (ab) blend fibers having a good balance between bondability and dispersibility. The polyamide blend (ab) can be obtained by melt-blending of polyamide (a) and polyamide (b) with an extruder or others.

When the base layer comprises mixed fibers of a polyamide (a) fiber as a subject fiber and a polyamide (ab) blend fiber as a binder fiber, the mixing ratio of polyamide (a) fiber relative to polyamide (ab) blend fiber, i.e., [polyamide (a) fiber]:[polyamide (ab) blend fiber] is, by mass ratio, preferably 90:10 to 50:50, more preferably 80:20 to 55:45. Since the polyamide (ab) blend fiber is a binder fiber, too much amount of polyamide (ab) blend fiber may cause reduced porosity of the laminate due to sealing of pores in the laminate by the polyamide (ab) blend fiber, even if the physical strength or peeling strength of the laminate may be enhanced. As a result, the separators comprising such laminate containing too much binder fibers may have high internal resistance, and capacitors comprising such separator may be poor in capacitor performance.

Incidentally, the base layer may include other fibers in addition to the polyamide (a) fiber and the polyamide (ab) blend fiber, as long as the performance of the base layer is not deteriorated.

The fiber morphology of the polyamide (a) fibers and the polyamide (ab) blend fibers constituting the base layer may be any of short fibers, filaments (long fibers), and a mixture thereof.

Both the polyamide (a) fiber and the polyamide (ab) blend fiber constituting the base layer preferably have a single-fiber fineness of 0.01 to 5.0 dtex, and more preferably 0.06 to 3 dtex from the viewpoint of striking a good balance between gas or liquid permeability and strength of the base layer. In the case where the fibers constituting the base layer have a too small single-fiber fineness to impart to the base layer such basis weight that the base layer can exert enough strength, the base layer may cause too high resistance and deteriorate in capability of passing the electrolyte therethrough. In contrast thereto, if the fibers constituting the base layer have a too large single-fiber fineness, the base layer comprising such fibers cannot contain many fibers, resulting in reduced strength of base layers as well as separators.

The method for producing the polyamide (a) fibers and the polyamide (ab) blend fibers is not limited to a specific one, and they can be produced, for example, by melt spinning or others.

The base layer morphology can be any of nonwoven fabrics, woven fabrics, knitted fabrics, and the like, and preferably be nonwoven fabrics from the viewpoint of capability as a separator, mechanical property, and the like.

In the case where the base layer comprises nonwoven fabrics, examples of the nonwoven fabrics includes wet-laid nonwoven fabrics, spunbonded nonwoven fabrics, melt-blown nonwoven fabrics, spunlaced nonwoven fabrics, thermobonded nonwoven fabrics, chemical bonded nonwoven fabrics, airlaid nonwoven fabrics, needlepunched nonwoven fabrics, and the like. Among them, the wet-laid nonwoven fabrics are preferable because they are suitable to obtain a base layer sheet (nonwoven fabric) having a thin and uniform structure.

The base layer preferably has a thickness of 15 to 70 μm, and more preferably 20 to 50 μm, and further preferably 23 to 40 μm from the viewpoint of striking a good balance between gas or liquid permeability and strength. In particular, when a laminate comprising the base layer having a thickness of within the above range is employed as separators, the separator can be thin enough to enhance the volume to be filled with electrode materials in capacitors. As a result, the capacitor comprising those separators can enhance the amount of the filled electrode materials and thereby improving capacitor performance.

Since the base layer is used as a support to hold a nanofiber layer in production of the laminate, the base layer needs to have enough strength to withstand production steps for producing laminates for separators. Therefore, the base layer preferably has a basis weight of 5 to 50 g/m$^2$, and more preferably 8 to 30 g/m$^2$. The base layer having a too small basis weight cannot ensure the strength sufficient to withstand the production process of the laminates. On the other hand, in the case where laminates comprising such base layer are used as separators, the base layer having a too large basis weight may have a too large thickness, resulting in giving too large thickness in separators. Accordingly, capacitors comprising the separators may have high resistance due to a too wide distance between the electrodes and deteriorate in capacitor performance.

In order to strike a good balance between gas or liquid permeability and strength, the base layer preferably has a porosity of 50 to 80%, and more preferably 55 to 70%. For example, when the base layer having a too low porosity is used as separators for capacitors, the capacitors tend to have high internal resistance, thereby deteriorating in smooth pass of electrolytes and in capacitor performance. On the other hand, the base layer having a too high porosity tends to have a reduced strength, thereby failing to function as a support (reinforcing layer) for a nanofiber layer.

In view of gas or liquid permeability and strength, the laminate as well as the separator of the present invention preferably comprises a base layer having a density (bulk density) of 0.25 to 0.7 g/cm$^3$, more preferably 0.3 to 0.6 g/cm$^3$, and further preferably 0.35 to 0.55 g/cm$^3$.

[Laminate]

In the laminate (separator) comprising a nanofiber layer and a base layer, the nanofiber layer is at least placed (positioned) on one surface or both surfaces of the laminate (separator), thereby the nanofiber layer having small-size pores can function as a shielding layer(s) to avoid passing electrode materials detached from the electrode.

Specific embodiments of the laminate in the present invention include, for example, bilayer structure of (nanofiber layer)/(base layer), three-layered structure of (nanofiber layer)/(base layer)/(nanofiber layer), five-layered structure of (nanofiber layer)/(base layer)/(nanofiber layer)/(base layer)/(nanofiber layer), and seven-layered structure of (nanofiber layer)/(base layer)/(nanofiber layer)/(base layer)/(nanofiber layer)/(base layer)/(nanofiber layer).

In the laminate comprising a plurality of nanofiber layers, even if a nanofiber layer on one surface of the laminate was damaged by abrasion or others in the production process, other nanofiber layers in the laminate can avoid passing fine particles (e.g., powder dusts, electrode materials), and can still retain collecting property of the laminate and shielding property of a separator comprising the laminate. However, if the number of layers in the separator is too many, the separator comprising such laminate sometimes tends to have a too large thickness, thereby enhancing internal resistance of the separator. Therefore, the separators are desired not to have high internal resistance.

In the separators, the laminates (separators) having a bilayer structure of (nanofiber layer)/(base layer) or a three-layer structure of (nanofiber layer)/(base layer)/(nanofiber layer) are preferably employed because the laminates having these structures do not have a too large thickness, can satisfy shielding property as well as avoid increase in internal resistance when used as capacitors, and achieve simplification of production process. Further, the capacitors comprising such laminate can enhance the volume to be filled with electrode materials due to reduced thickness of the separator, and achieve high performance because of increase in the amount of the filled electrode materials. The three-layer structure is preferred among them.

If the laminate (separator) of the present invention has a total thickness (entire thickness) of 18 to 100 μm, particularly 25 to 50 μm (e.g., 27 to 49.5 μm), the laminates can satisfy strength as well as handleability and have a reduced internal resistance. Further, the capacitors comprising such laminate can enhance the volume to be filled with electrode materials due to thinning of the separator, and achieve high performance because of increase in the amount of the filled electrode materials.

Moreover, the ratio of the base layer thickness relative to the nanofiber layer thickness can be selected depending on the total thickness of the laminate. For example, the base layer preferably has a thickness of about 0.8 time to 3.5 times of the thickness of the nanofiber layer, more preferably about 0.9 time to 3.3 times thereof, further preferably about 1.0 time to 3 times thereof. When the laminate is set to have the above ratio of the nanofiber layer thickness to the base layer thickness, not only can the nanofiber layer effectively exert its characteristics in the laminate, but also the laminate can still retain its strength entirely and improve its durability.

The laminate of the present invention preferably has an average pore size (average pore diameter) of 0.1 to 10 μm, more preferably 0.2 to 9 μm, and more preferably 0.3 to 8 μm in the entire laminate from the view point of striking a good balance between fine particles collecting property and gas or liquid permeability of the laminate.

Further, when the laminate of the present invention is employed as separators, the separator preferably has an average pore size (average pore diameter) of 0.1 to 10 μm, more preferably 0.15 to 5 μm, and further preferably 0.2 to 3 μm in the entire separator in view of excellent shielding property thereof from electrode materials and reduced internal resistance.

In the case where the average pore size of the separator is too small, the separators tend to have high internal resistance and reduce passage of electrolytes therethrough even if the separator has an improved shielding property thereof from electrode materials. On the other hand, in the case where the average pore size of the separators is too large, the separators tend to reduce shielding property thereof from electrode materials and may generate a large leakage current.

It should be noted that the "average pore size (average diameter)" in this specification means an average pore size (average diameter) obtained in the manner described in the below-mentioned EXAMPLES.

Since the laminate of the present invention comprises a nanofiber layer and a base layer both are formed from a specific kind of polyamide, the laminate is excellent in heat resistance. The laminate, for example, may have a rate of dimensional change before and after heating of lower than 2.5%, preferably not higher than about 2.3%, further preferably not higher than about 2.1%, when the laminate is subjected to drying treatment in a dryer kept at a temperature of 200° C. under a vacuum atmosphere for 24 hours.

Incidentally, when the laminate having a too high rate of dimensional change after heating (e.g., 3.0% or higher) is used under severe conditions such as in engine rooms, the laminate may cause thermal shrinkage. As a result, such laminate becomes unusable in a short period of the time and lacks in durability. Further, in the case where such laminate is used as separators, the laminate having a too high rate of dimensional change after heating may cause thermal shrinkage during drying treatment in the production process of capacitors. As a result, the positive and negative electrodes in capacitors comprising the laminate may come into contact. In such a case, capacitor does not work.

It should be noted that the "rate of dimensional change before and after heating" of the separator in this specification means a rate of dimensional change before and after heating obtained in the manner described in the below-mentioned EXAMPLES.

In the present invention, the process for producing a laminate applicable to separators is not limited to a specific one, and the laminate can be smoothly produced by the following procedure. The layer comprising nanofilaments is formed by electro-spinning of a spinning liquid, i.e., a solution of a polyamide (a) in an organic solvent or a molten liquid of a polyamide (a), on a base sheet comprising polyamide (a) fibers, or on a base sheet comprising mixed fibers of a polyamide (a) fiber and a polyamide (ab) blend fiber. The electro spun fibers are laminated (deposited) on the base sheet to form a nanofiber layer comprising polyamide (a) nanofilaments having such an average fiber diameter as 10 to 600 nm in a form of nonwoven fabric, resulting in forming a laminate comprising the nanofiber layer and the base layer, the laminate at least comprising the nanofiber layer on one surface or both surfaces thereof. Thereafter, if necessary (preferably), the laminate is subjected to heat pressing at a temperature that can soften or melt the polyamide (ab) blend fibers but cannot soften or melt the polyamide (a) nanofilaments and the polyamide (a) fibers.

As for the laminate comprising nanofiber layers on both surfaces, in other words the laminate comprising two nanofiber layers in total, such laminate can be produced by repeating the above processes on both sides of the base layer or can be produced with a electro-spinning machine capable of forming nanofiber layers on both surfaces of the base layer at one time.

When a polyamide (a) is allowed to be dissolved in an organic solvent to prepare a spinning liquid for electro-spinning, any of organic solvents capable of dissolving the polyamide (a) can be used as the organic solvent for the spinning liquid. Examples of such solvents include protonic polar solvents such as hexafluoroisopropanol (HFIP), phenol, cresol, concentrated sulfuric acid, formic acid, and others; non-protonic polar solvents such as N-methyl pyrrolidone (NMP), dimethyl sulfoxide (DMSO), dimethyl acetoamide (DMAc), and others. Among the organic solvents, hexafluoroisopropanol or formic acid is preferably used from the viewpoint of stability of spinning liquid.

The concentration of the polyamide (a) in the spinning liquid dissolved with the organic solvent is preferably about 2 to 20% by mass and more preferably about 3 to 15% by mass from the viewpoint of forming nanofilaments having such an average fiber diameter as 10 to 600 nm smoothly. With respect to the concentration of the polyamide (a) in the spinning liquid, if the polyamide (a) concentration is too low, the electro spun product with the solution tends to become a clump of bead-like gel. In contrast thereto, if the polyamide (a) concentration is too high, the electro spun polyamide (a) nanofilaments tend to have an average fiber diameter beyond the above range.

Moreover, when the polyamide (a) is molten by heating to prepare a molten liquid of polyamide as a spinning liquid, the heating may be conducted preferably at 250 to 370° C., more preferably 270 to 350° C. to provide a molten polyamide for conducting electro-spinning. When the melting temperature is too low, the molten polyamide has a too high viscosity. The molten polyamide having such a high viscosity tends to produce filaments having a larger average fiber diameter and may fail to produce polyamide (a) nanofilaments having an average fiber diameter of 10 to 600 nm. On the other hand, when the melting temperature is too high, the molten polyamide tends to deteriorate due to thermal degradation.

The method for electro-spinning is not particularly limited to a specific one, and any method can be used as far as the method comprises the steps of applying a high voltage to a conductive member (nozzle) capable of extruding a spinning liquid for forming nanofibers, and depositing the nanofibers on the side of a counter conductive member being earthed. In the electro-spinning steps, a sheet for a base layer may be placed on the counter conductive member so as to directly provide a laminate comprising a nanofiber layer in the form of nonwoven web on the base layer.

In this method, the spinning liquid is supplied from a spinning liquid supply unit, and the supplied liquid is extruded with applying high electric charge so that the liquid is electric-charged and split into droplets. Thereafter, by the action of the electrical field, continuous fibers (nanofilaments) are drawn (spun) and split from one point of the electric-charged droplets, and a number of continuous fibers (nanofilaments) are spread. When a polyamide solution diluted with an organic solvent is used as the spinning liquid, even if the concentration of the polyamide (a) in the solution is not higher than 10% by mass, the solvent is easily evaporated during filament formation and drawing process; and the spun filaments are deposited on a fiber sheet for a base layer on a collecting belt or directly on the collecting belt positioned at the distance from the nozzle in a range between several centimeters and several tens of centimeters. On the other hand, when a molten liquid of a polyamide is used as a spinning liquid, the molten polyamide is cooled at its melting temperatures during filament formation and drawing process; and the spun filaments are deposited on a fiber sheet for a base layer or directly on a collecting belt in the same way with above. In the deposition step, the slight bonding of the deposited nanofilaments can be formed at their crossover points in a semi-dry condition. As a result, the fiber movement between the nanofilaments is avoided. Then, the nanofilaments can be deposited successively to form a nanofiber layer comprising the nanofilaments.

The kind of apparatus is not limited to a specific one, and as one embodiment of the preferred apparatuses for producing a laminate capable of comprising separator of the present invention, there may be exemplified an electro-spinning machine described in FIG. 1.

FIG. 1 shows a metering pump 1 for feeding a spinning liquid, a distributing and rectifying means 2, a nozzle 3, a protruding spinneret 4, an electrical insurant member 5, a power source 6 supplying a high voltage direct current, a conveying device 7 comprising an endless conveyor, and a conductive member 8.

The preferred method for producing a laminate comprising a nanofiber layer and a base layer, to be applicable to separators, of the present invention will now be explained with a device shown in FIG. 1. A spinning liquid comprising a polyamide (a) in an organic solvent (polyamide (a) solution) or a molten liquid of polyamide (a) is measured to give a predetermined amount with the metering pump 1, and the measured liquid is distributed under a uniform pressure and flow rate by the distributing and rectifying means 2 and fed into the nozzle 3. The nozzle 3 comprises the protruding spinnerets 4, each of them having a hollow needle-like structure and being fitted to the nozzle 3. The electrical insurant member 5 can prevent the entire portion of the nozzle 3 from leaking electricity. The protruding spinnerets 4, each made of a conductive material, are attached to the nozzle 3 so as to be oriented vertically downwardly. The lines of spinnerets are positioned in parallel with each other, and each line is aligned in the direction perpendicular to the moving direction of the conveying device 7 comprising an endless conveyor. Each of the spinnerets 4 is connected to one output terminal of the power source 6 through conducting wire to allow the power source 6 to apply a high voltage direct current (DC) to the spinnerets. The earthed conductive member 8 is attached to the endless conveyor of the conveying device 7 to neutralize the electrical potential applied to the spinnerets. Although FIG. 1 does not show, the base sheet may be wound on the conductive member 8, or the base sheet having a longer or shorter length can be placed on the conductive member 8. Thereby the base sheet can be moved by the endless conveyer supporting the conductive member 8 from the right side to the left side in FIG. 1. The spinning liquid supplied from the liquid supply unit is pressure-fed into the projecting spinnerets 4 through the nozzle 3, and then the supplied liquid is extruded with applying high electric charge so that the liquid is electric-charged and split into droplets. Thereafter, by the action of the electrical field, continuous fibers (nanofilaments) are drawn (spun) and split from one point of the electric-charged droplets, and a number of continuous fibers (nanofilaments) are spread. The spread filaments are deposited in a semi-dry condition on a base sheet wound or positioned on the conductive member 8 attached to the conveying device 7. The deposited nanofilaments, having slight bonding at their crossover points, are moved with the movement of the base layer on the conveying device 7, and another deposition of the nanofilimaments from an adjacent line of spinnerets to the former line is successively carried out with the movement of the conveying device 7. As a result, the successive depositions of nanofilaments can form a sheet-like nanofiber layer having a uniform structure on the base layer. Consequently, a laminate comprising the nanofiber layer and the base layer and being suitable for separators can be obtained.

If necessary, thus obtained laminate for separators comprising the nanofiber layer and the base layer can be further subjected to hot pressing treatment such as embossing treatment or calendaring treatment to fuse-bond the nanofiber layer to the base layer strongly.

Further, if necessary, the thickness of the laminate for separators obtained in the above method may be adjusted to a desired one by heat pressing or cold pressing.

Then, a capacitor (e.g., an electric double layer capacitor) can be produced by sandwiching the separator of the present invention between positive and negative electrodes to form a capacitor element, and impregnating the element with an electrolyte to form the capacitor. The species of positive and negative electrodes, and the species of electrolytes employed in the capacitor are not limited to a specific one, and any species known in the art can be used in the capacitor, particularly in the electric double layer capacitor. In particular, the separator of the present invention is suitably used as a separator for electric double layer capacitors employing carbon-containing positive and negative electrodes and a non-aqueous organic electrolyte [e.g., an electrolyte dissolving a salt of tetraalkylammonium cation and an anion such as $BF_4^-$, $PF_6^-$, $SO_3CF_3^-$, $AsF_6^-$, $N(SO_2CF_3)_2^-$, and $ClO_4^-$ with an organic solvent such as propylene carbonate, ethylene carbonate, dimethyl carbonate, diethyl carbonate, methylethyl carbonate, sulfolane, and methylsulfolane].

EXAMPLES

Hereinafter, the present invention will be demonstrated by way of some examples that are presented only for the sake of illustration, which are not to be construed as limiting the scope of the present invention. It should be noted that the physical properties were evaluated in the following manners in the following Examples and Comparative Examples.

(1) Intrinsic Viscosity of Polyamide:

Sample solutions, each containing polyamide in sulfuric acid in a concentration of 0.05 g/dl, 0.1 g/dl, 0.2 g/dl or 0.4 g/dl at 30° C., were prepared, and respective intrinsic viscosities (ηinh) of those sample solutions were measured, followed by extrapolation into the concentration of 0 g/dl to provide intrinsic viscosities (η).

It is to be noted that the intrinsic viscosity (ηinh) of each of those sample solutions can be determined by the following equation:

$$\text{Intrinsic Viscosity}(\eta inh)(dl/g) = [\ln(t_1/t_0)]/c \quad (i)$$

[In this equation, "$t_1$" represents the time of flow (second) of the solvent (sulfuric acid), "$t_0$" represents the time of flow (second) of the respective sample solution, and "c" represents the concentration (g/dl) of polyamide in the respective sample solution.]

(2) Average Diameter of Fibers Forming Nanofiber Layer, Base Layer and Nonwoven Fabric Sheet:

Each of the separators (laminate comprising the nanofiber layer and the base layer or nonwoven fabric sheet) prepared in accordance with the following Examples and Comparative Examples was cut in a direction across the thickness thereof; the section of the cut face of the separator was photographed at the magnifying power of 5,000 with the use of an electron microscope manufactured by Hitachi, Ltd. With respect to the cross section of all fibers encompassed within the square of 20×20 mm in size of the photograph so obtained, the diameter of each fiber, defined as the greatest length of the fiber cross section, was measured. Then the average value of the diameters measured was taken as the average fiber diameter of the separators (laminates comprising the nanofiber layer and the base layer, or nonwoven fabric sheets). It is to be noted that so far as the laminate comprising the nanofiber layer and the base layer is concerned, the average fiber diameter of the fibers forming each of those layers was determined individually.

The average fiber diameter is the average value determined from about 20 fiber cross sections in the square so far as the nanofiber layer is concerned, and the average fiber diameter is the average value determined from about 20 fiber cross sections in the square so long as each of the base layer and the nonwoven sheet is concerned.

(3) Basis weight of Laminate, Nanofiber Layer, Base Layer and Nonwoven Fabric ($g/m^2$):

With respect to each of the separators (the nonwoven sheet or the laminate comprising the nanofiber layer and the base layer) prepared in accordance with the following Examples and Comparative Examples, the basis weight of the respective separator (laminate) in its entirety, the basis weight of each of the nanofiber layer and the base layer both contained in the laminate, and the basis weight of the nonwoven sheet were measured according to the "method of measuring the basis weight of papers" stipulated in JIS P 8124.

(4) Thickness of Laminate, Nanofiber layer, Base Layer and Nonwoven Fabric (μm):

With respect to each of the separators (the nonwoven sheet or laminate comprising the nanofiber layer and the base layer) prepared in accordance with the following Examples and Comparative Examples, the thickness of the respective laminate in its entirety, the thickness of each of the nanofiber layer and the base layer both contained in the laminate, and the thickness of the nonwoven sheet were measured according to the "determination of thickness and apparent bulk density of paper and board" stipulated in JIS P 8118.

(5) Porosity of Laminate, Nanofiber Layer, Base Layer and Nonwoven Fabric:

With respect to each of the separators (the nonwoven sheet or laminate comprising the nanofiber layer and the base layer) prepared in accordance with the following Examples and Comparative Examples, the porosity (%) of the respective laminate in its entirety, the porosity (%) of each of the nanofiber layer and the base layer both contained in the laminate, and the porosity (%) of the nonwoven sheet were measured according to the following equation:

$$\text{Porosity}(\%) = [(d_1 - E)/d_1] \times 100 \quad \text{(ii)}$$

In this equation (ii), "$d_1$" represents the gravity (g/cm$^3$) of resin (polymer) forming fibers constituting the nanofiber layer, the base layer or the nonwoven sheet (where a mixture of two or more types of fibers is employed, this gravity is calculated according to the mixing ratio); and "E" represents the product (the bulk density of the nanofiber layer, the base layer or the nonwoven sheet, expressed by unit "g/cm$^3$") of the basis weight of each of the nanofiber layer, the base layer and the nonwoven sheet, determined as set forth under (3) above, multiplied by the inverse number of the thickness of each of the nanofiber layer, the base layer and the nonwoven sheet, determined as set forth under (4) above.

(6) Average Pore Size (Average Pore Diameter) of Laminate (Separator):

With respect to each of the separators (the nonwoven sheet or laminate comprising the nanofiber layer and the base layer) prepared in accordance with the following Examples and Comparative Examples, by using the "Colter POROMETER II" manufactured by and available from Colter Electronics, Inc., a distribution of pore sizes of the sheet (separator) was measured according to the bubble point method, and the average value thereof is determined as the average pore size (μm).

(7) Peeling Strength of Laminate (Separator):

A test piece, 30 mm in width and 170 mm in length, was picked up from each of the separators (the laminate comprising the nanofiber layer and the base layer) prepared in accordance with the following Examples and Comparative Examples; the test piece was peeled 50 mm between the nanofiber layer and the base layer from one end of the test piece in its longitudinal direction. The peel test was conducted using a peel testing machine ("Model 5540" manufactured by and available from INSTRON Co., Ltd.) to determine the strength exhibited at the time of peeling, and the maximum load exhibited at the time of peeling is determined as the peeling strength.

(8) Electrolyte Resistance of Laminate (Separator):

With respect to a test piece (15 mm in width and 170 mm in length) picked up from each of the separators (the nonwoven sheet or the laminate comprising the nanofiber layer and the base layer) prepared in accordance with the following Examples and Comparative Examples, the strength (N/15 mm) of the test piece before and after the treatment with the electrolyte was measured to determine the electrolyte resistance in accordance with JIS P 8113. Then, the strength retention (%) after the treatment relative to before the treatment was determined from the obtained strength values for each test piece, and the strength retention (%) was regarded as the electrolyte resistance.

It is to be noted that the treatment of the test piece with the electrolyte is carried out by immersing the test piece in a bath of propylene carbonate (available from Wako Pure Chemical Industries, Ltd.), heated to 50° C., for one hour under nitrogen atmosphere.

(9) Heat Resistance (Rate of Dimensional Change before and after heating) of Laminate (Separator):

Each of the separators (the nonwoven sheet or laminate comprising the nanofiber layer and the base layer) prepared in accordance with the following Examples and Comparative Examples had been humidity-controlled for 24 hours under a condition, in which the temperature was 23° C. and the humidity was 65% RH. A test piece, 20×20 cm in size, was picked up from the conditioned separator; the test piece was subsequently dried for 24 hours under a vacuum atmosphere within a dryer kept at 200° C.; the test piece then removed out of the dryer, and then the test piece again was humidity-controlled for 24 hours under a condition, in which the temperature was 23° C. and the humidity was 65% RH. Thereafter, the longitudinal and transverse dimensions of the heat-treated test piece were measured. Of the longitudinal and transverse dimensions, the dimension exhibited a greater dimensional change and the dimension (20 cm) before the drying treatment were compared with each other and evaluated.

(10) Leakage Current and Internal Resistance of Electric Double Layer Capacitor:

After each of the electric double layer capacitors prepared in accordance with the following Examples and Comparative Examples had been charged to 2.7 V with a charging current of 20 mA, charging was carried out for two hours under a constant voltage condition of 2.7 V and then discharging was carried out at a discharging current of 20 mA to 0 V. This charging and discharging cycle was repeated five times, and the current value after retention for 2 hours with the constant voltage charging at the fifth cycle was determined as the leakage current.

Also, the internal resistance was determined by a voltage drop at the time of immediately after discharging in the previously described cycle.

Regarding the leakage current, as the level required by a high performance capacitor, the level lower than 50 μA is deemed extremely excellent (A), the level lower than 100 μA is deemed excellent (B), and the level equal to or higher than 100 μA, at which the performance fails to satisfy the performance level of an ordinary capacitor, is deemed unacceptable (C).

With respect to the internal resistance, as the level required by a high performance capacitor, the level lower than 1.5Ω is deemed extremely excellent (A), the level lower than 2.0Ω is deemed excellent (B), and the level equal to or higher than 2.0Ω, at which the performance fails to satisfy the performance level of an ordinary capacitor, is deemed unacceptable (C).

Example 1

(1) Production of Wet-Laid Nonwoven Fabric for Base Sheet (i) A polyamide (intrinsic viscosity: 0.73 dl/g, end-capping percentage: 91%; hereinafter referred to as "polyamide 9T") comprising, as dicarboxylic acid units, terephthalic acid unit in the proportion of 100% by mole based on the dicarboxylic acid units, and, as diamine unit, 1,9-nonanediamine unit in the proportion of 50% by mole and 2-methyl-1,8-octanediamine unit in the proportion of 50% by mole based on the diamine units, was melt-spun and drawn to produce polyamide drawn filaments (drawn fibers) having a single-fiber fineness of 0.1 dtex, and then the drawn filaments were cut to produce short fibers (subject fibers) having a fiber length of 3 mm.

(ii) Forty parts by mass of a polyamide ("SEALAR PA3426" manufactured by and available from DU PONT-MITSUI POLYCHEMICAL CO., LTD.; hereinafter referred to as "polyamide 6IT") comprising, as dicarboxylic acid units, terephthalic acid unit in the proportion of 80% by mole and isophthalic acid unit in the proportion of 20% by mole based on the dicarboxylic acid units, and, as diamine units, 1,6-hexanediamine unit in the proportion of 100% by mole based on the diamine units, were dry-blended with 60 parts by mass of the polyamide 9T in the same kind used in the above (i) procedure. The blend polyamide was melt-mixed and spun into polyamide filaments having a single-fiber fineness of 2.9 dtex, and then the spun filaments were cut to produce short fibers (binder fibers) having a fiber length of 10 mm.

(iii) Seventy parts by mass of the subject fibers and 30 parts by mass of the binder fibers were dispersed in water to prepare a papermaking material (fiber content of 0.2% by mass), and then from the papermaking material was formed a web sheet with a Fourdrinier paper machine, subsequently the resultant undried sheet was dried with a Yankee dryer to produce a wet-laid nonwoven fabric for a base layer having a basis weight of 11.8 g/m².

(2) Production of Laminate (i) The same polyamide 9T as used in the above (1) (ii) was added into formic acid to dissolve in a still-standing state at a temperature of 25° C. to prepare a spinning liquid (or spinning solution) in the concentration of 20% by mass.

(ii) By using the spinning solution obtained in the above (i), electro-spinning was conducted with a spinning machine of FIG. 1 to produce a laminate comprising a base layer and a nanofiber layer overlaid on the base layer.

More specifically, a needle having an inside diameter of 0.9 mm was used as the spinneret 4, and the distance between the spinnerets 4 and the conveying device 7 was set to be 15 cm. The wet-laid nonwoven fabric for the base layer obtained in the procedure of (1) was placed and wound up on the entire surface of the conductive member 8 attached to the conveying device 7. Then, while moving the conveying device 7 at a conveyer speed of 0.1 m per minute, the spinning solution was extruded from the spinnerets 4 in a predetermined supply amount with applying the voltage of 20 kV to the spinnerets 4 to laminate (deposit) nanofilaments of polyamide 9T (average fiber diameter of the nanofilament: 320 nm) having an even thickness at the basis weight of 4.1 g/m² on the wet-laid nonwoven base layer on the upper surface of the conductive member 8 to prepare a laminate (multilayer sheet) comprising the nanofiber layer and the base layer overlaid with the nanofiber layer.

(iii) The laminate product (multilayer sheet) obtained in the above (ii) was removed from the device, and subjected to heat pressing treatment at a temperature of 170° C. for 60 seconds to improve the unity (or bonding) between the base layer and the nanofiber layer in the laminate; thereby a laminate for separators was produced.

The properties of thus obtained laminate were measured or evaluated in the above method, and the obtained properties are shown in Table 1.

(3) Production of Electric Double Layer Capacitor (i) Activated carbon ("YP17D" manufactured by and available from KURARAY CHEMICAL CO., LTD.), polytetrafluoroethylene, and carbon black ("DENKA BLACK" manufactured by and available from DENKI KAGAKU KOGYO KABUSHIKI KAISHA) were mixed and kneaded at a mass ratio of 80:10:10, and the resultant mixture was extended with applying pressure to produce a sheet having a thickness of 150 μm. From the above sheet, were cut two pieces of square sheet samples, each of them having 30×30 mm in size, to prepare two polarizable electrode sheets.

(ii) From the laminate for separators obtained in the above (2), was cut a piece of square sheet sample having 40×40 mm in size, to prepare a piece of separator sheet. The separator sheet and the two polarizable electrode sheets were dried with a vacuum dryer kept at 180° C. for 12 hours. Thereafter, the polarizable electrode sheets and the separator sheet were kept in a dry box at an atmosphere of dew point of not higher than −60° C.

(iii) The polarizable electrode sheets and the separator sheet were impregnated with a propylene carbonate solution (water content: 20 ppm or lower) having tetraethyl ammonium tetrafluoroborate in the concentration of 1 mole per liter under a vacuum atmosphere, then the separator sheet was sandwiched with the polarizable electrode sheets in the order of polarizable electrode sheet, separator and polarizable electrode sheet to produce an electric double layer capacitor.

(iv) The properties (leakage current and internal resistance) of the electric double layer capacitor produced in the above (iii) were evaluated in the above method, and the obtained properties are shown in Table 3.

Example 2

(1) Except that, instead of Example 1 (2) (i), the concentration of the polyamide 9T in the spinning solution for the nanofiber layer was changed from 20% by mass into 10% by mass, that the distance between each of the spinnerets 4 and the conveying device 7 was changed from 15 cm into 13 cm, and that the nanofilaments of polyamide 9T having an average fiber diameter of 80 nm was overlaid (deposited) on the wet-laid nonwoven fabric at an even thickness of 3.7 g/m², a laminate was obtained in the same way with those of Example 1 (1) and (2).

The properties of thus obtained laminate were measured or evaluated in the above method, and the obtained properties are shown in Table 1.

(2) With the laminate for separators obtained in the above (1), an electric double layer capacitor was produced in the same manner with Example 1 (3), and the properties (leakage current and internal resistance) of thus obtained electric double layer capacitor were evaluated in the above method, and the obtained properties are shown in Table 3.

Example 3

(1) Except that, instead of Example 1 (2) (i), the concentration of the polyamide 9T in the spinning solution for the nanofiber layer was changed from 20% by mass into 23% by mass and that the nanofilaments of polyamide 9T having an average fiber diameter of 500 nm was overlaid (deposited) on the wet-laid nonwoven fabric at an even thickness of 3.3 g/m², a laminate was obtained in the same way with those of Example 1 (1) and (2).

The properties of thus obtained laminate were measured or evaluated in the above method, and the obtained properties are shown in Table 1.

(2) With the laminate for separators obtained in the above (1), an electric double layer capacitor was produced in the same manner with Example 1 (3), and the properties (leakage current and internal resistance) of thus obtained electric double layer capacitor were evaluated in the above method, and the obtained properties are shown in Table 3.

Example 4

(1) Production of Wet-Laid Nonwoven Fabric for Base Sheet (i) The polyamide 9T was melt-spun and drawn to produce polyamide drawn filaments (drawn fibers) having a single-fiber fineness of 0.7 dtex, and then the drawn filaments were cut to produce short fibers (subject fiber) having a fiber length of 10 mm.

(ii) Seventy parts by mass of the subject fibers obtained in the above (i) and 30 parts by mass of the binder fibers obtained in Example 1 (1) (ii), were dispersed in water to prepare a papermaking material (fiber content of 0.2% by mass), and then from the papermaking material was formed a web sheet with a Fourdrinier paper machine, subsequently the resultant undried sheet was dried with a Yankee dryer to produce a wet-laid nonwoven fabric for a base layer having a basis weight of 11.8 g/m².

(2) Production of Laminate

Except that the wet-laid nonwoven fabric obtained in the above (1) was placed on the conductive member 8 in Example 1, a laminate was produced in the same manner with Example 1 (1) and (2).

The properties of thus obtained laminate were measured or evaluated in the above method, and the obtained properties are shown in Table 1. Then the laminator was used as a separator, and the separator showed the properties as shown in Table 3.

Example 5

(1) Except that the concentration of the polyamide 9T in the spinning solution for the nanofiber layer was changed into 8% by mass, a laminate was obtained in the same way with those of Example 1.

The properties of thus obtained laminate were measured or evaluated in the above method, and the obtained properties are shown in Table 1. Then the laminator was used as a separator, and the separator showed the properties as shown in Table 3.

Example 6

(1) Except that the concentration of the polyamide 9T in the spinning solution for the nanofiber layer was changed into 23.5% by mass, a laminate was obtained in the same way with those of Example 1.

The properties of thus obtained laminate were measured or evaluated in the above method, and the obtained properties are shown in Table 1. Then the laminator was used as a separator, and the separator showed the properties as shown in Table 3.

Example 7

(1) Except that the concentration of the polyamide 9T in the spinning solution for the nanofiber layer was changed into 26% by mass, a laminate was obtained in the same way with those of Example 1.

The properties of thus obtained laminate were measured or evaluated in the above method, and the obtained properties are shown in Table 1.

Example 8

(1) Except that the concentration of the polyamide 9T in the spinning solution for the nanofiber layer was changed into 24% by mass, a laminate was obtained in the same way with those of Example 1.

The properties of thus obtained laminate were measured or evaluated in the above method, and the obtained properties are shown in Table 1.

Comparative Example 1

(1) Island-in-sea conjugated fibers comprising the polyamide 9T used in Example 1 as an island component and an easily alkali-soluble polyester copolymer comprising 5-sulfoisophthalic acid sodium salt as a sea component were produced by melt-spinning and drawing, and the sea component of the conjugated fiber was completely removed by alkali to produce polyamide drawn filaments having a single-fiber fineness of 0.005 dtex. The obtained filaments were cut to produce short fibers (subject fiber) having a fiber length of 1 mm.

(2) Forty parts by mass of the polyamide 6IT used in Example 1 (1) were dry-blended with 60 parts by mass of the polyamide 9T. The blend polyamides were spun into polyamide fibers having a single-fiber fineness of 2.9 dtex, and then the spun filaments were cut to produce short fibers (binder fibers) having a fiber length of 10 mm.

(3) Seventy parts by mass of the subject fibers obtained in the above (1) and 30 parts by mass of the binder fibers obtained in the above (2) were dispersed in water to prepare a papermaking material (fiber content of 0.2% by mass), and then from the papermaking material was formed a web sheet with a Fourdrinier paper machine, subsequently the resultant undried sheet was dried with a Yankee dryer to produce a wet-laid nonwoven fabric having a basis weight of 14.2 g/m².

The properties of thus obtained wet-laid nonwoven fabric were measured or evaluated in the above method, and the obtained properties are shown in Table 2.

(4) From the wet-laid nonwoven fabric obtained in the above (3) was cut a piece of nonwoven fabric sample having 40×40 mm in size to prepare a piece of separator sheet. With the separator sheet was produced an electric double layer capacitor in the same way with Example 1 (3), and the properties (leakage current and internal resistance) of thus obtained electric double layer capacitor were evaluated in the above method, and the obtained properties are shown in Table 3.

Comparative Example 2

(1) (i) Into a dissolution bath was put pre-opened pulp ("ALICELL", degree of polymerization DP=621, manufactured by and available from Western pulp Ltd.), then the bath was heated to 80° C. and let stand for 1 hour.

(ii) In addition, into another dissolution bath containing N-methylmorpholine-N-oxide hydrate heated at 90° C., were added and agitated n-propyl gallate (dissolving stabilizer, concentration: 0.25% by mass based on the pulp amount) and sodium laurate (surfactant: 0.25% by mass based on the pulp amount) to prepare a solution thereof.

(iii) The solution prepared in the above (ii) was sprayed on the above (i) pulp heated at 80° C., then the lid of the dissolution bath was closed to conduct nitrogen substitution, and the bath was let stand for 30 minutes to swell the pulp sufficiently. Then the swelled pulp was agitated with the agitator in the dissolution bath for 1 hour to dissolve the pulp completely. Thereafter, elevating the temperature of the dissolution bath up to 100° C., and the agitation was ceased and let the bath stand for another 4 hours to prepare a sufficiently defoamed spinning solution.

(2) (i) Except that the spinning solution obtained in the above (1) was used, electro-spinning was conducted in the same way with Example 1 (2) with the electro-spinning device. That is, the wet-laid nonwoven fabric [the same wet-laid nonwoven fabric with the one obtained in Example 1 (1)] was placed on the conductive member 8, and nanofilaments of the cellulose having an average fiber diameter of 450 nm was overlaid (deposited) on the fabric at an even thickness of 3.9 g/m² to produce a laminate (multilayer sheet) comprising the nanofiber layer and the base layer.

(ii) The laminate product (multilayer sheet) obtained in the above (i) was removed from the device, and subjected to heat pressing treatment at a temperature of 170° C. for 60 seconds to improve the unity between the base layer and the nanofiber layer. The properties of thus obtained laminate were measured or evaluated in the above method, and the obtained properties are shown in Table 2.

It should be noted that the obtained laminate having low heat resistance could not be used as a separator for capacitors because the nanofiber layer was embrittled due to the heating at the heat pressing. Accordingly, neither the production of an electric double layer capacitor nor the evaluation of properties thereof was conducted.

Comparative Example 3

(1) Production of Wet-Laid Nonwoven Fabric for Base Sheet

Seventy parts by mass of polyethylene terephthalate (PET) fibers (subject fibers) having a single-fiber fineness of 0.5 dtex, "EP043X3" manufactured by and available from KURARAY CO., LTD., and 30 parts by mass of undrawn PET fibers (binder fiber) having a single-fiber fineness of 1.1 dtex, "EP101X5" manufactured by and available from KURARAY CO., LTD., were dispersed in water to prepare a papermaking material (fiber content of 0.2% by mass), and then from the papermaking material was formed a web sheet with a Fourdrinier paper machine, subsequently the resultant undried sheet was dried with a Yankee dryer to produce a wet-laid nonwoven fabric for a base layer having a basis weight of 12.1 g/m².

(2) Production of Laminate

Except that the wet-laid nonwoven fabric formed from the PET fibers obtained in the above Comparative Example (1) was used as a base sheet instead of the wet-laid nonwoven fabric of polyamide fibers obtained in Example 1 (1), electro-spinning was conducted in the same way with Example 1 (2) to produce a laminate comprising the nanofiber layer comprising the polyamide 9T nanofilaments and the base layer comprising the wet-laid nonwoven fabric of PET fibers overlaid with the nanofiber layer.

The properties of thus obtained laminate were measured or evaluated in the above method, and the obtained properties are shown in Table 2.

It should be noted that the obtained laminate was deteriorated in heat resistance because the nanofiber layer was peeled from the base layer due to heating at the heat pressing. Accordingly, neither the production of an electric double layer capacitor nor the evaluation of properties thereof was conducted.

Comparative Example 4

(1) Meta-aramid fibers (2.0 dtex, "CONEX" manufactured by and available from TEIJIN LIMITED.) were cut to obtain short fibers having a fiber length of 1 mm, and the short fibers were refined with a single disk refiner to obtain fibrillated fibers having an average fiber diameter of 500 nm.

(2) Seventy parts by mass of the meta-aramid fibrillated fibers obtained in the above (1) and 30 parts by mass of the binder fibers (polyamide fibers) obtained in Example 1 (1) were dispersed in water to prepare a papermaking material (fiber content of 0.2% by mass), and then from the papermaking material was formed a web sheet with a Fourdrinier paper machine, subsequently the resultant undried sheet was dried with a Yankee dryer to produce a wet-laid nonwoven fabric having a basis weight of 21.1 g/m².

The properties of thus obtained wet-laid nonwoven fabric were measured or evaluated, and the obtained properties are shown in Table 2.

(3) From the wet-laid nonwoven fabric obtained in the above (2) was cut a piece of nonwoven fabric sample having 40×40 mm in size to prepare a piece of separator sheet. With the separator sheet was produced an electric double layer capacitor in the same way with Example 1 (3), and the properties (leakage current and internal resistance) of thus obtained electric double layer capacitor were evaluated in the above method, and the obtained properties are shown in Table 3.

Comparative Example 5

(1) Production of Wet-Laid Nonwoven Fabric for Base Sheet

A wet-laid nonwoven fabric for a base sheet was produced in the same way with Comparative Example 3 (1).

(2) Production of Laminate (i) Polyacrylonitrile (average molecular weight of 150,000, manufactured by and available from Sigma-Aldrich Co.) was added into DMF solvent to dissolve in a still-standing state at a temperature of 25° C. to prepare a spinning solution in the concentration of 14% by mass.

(ii) By using the spinning solution obtained in the above (i), electro-spinning was conducted with a spinning machine of FIG. 1 to produce a laminate comprising a base layer and a nanofiber layer overlaid on the base layer.

More specifically, a needle having an inside diameter of 0.9 mm was used as the spinneret 4, and the distance between each of the spinnerets 4 and the conveying device 7 was set to 13 cm. The wet-laid nonwoven fabric for the base layer obtained in the above (1) was placed and wound up on the entire surface of the conductive member 8 attached to the conveying device 7. Then, with moving the conveying device 7 at a conveyer speed of 0.1 m per minute, the spinning solution was extruded from the spinnerets 4 in a predetermined supply amount with applying the voltage of 18 kV to the spinneret 4 to laminate (deposit) nanofilaments of the polyacrylonitrile (average fiber diameter of the nanofilament: 270 nm) having an even thickness at the basis weight of 3.1 g/m² on the wet-laid nonwoven base layer on the upper surface of the conductive member 8 to prepare a laminate (multilayer sheet) comprising the nanofiber layer and the base layer overlaid with the nanofiber layer.

(iii) The laminate obtained in the above (ii) was removed from the device, and subjected to heat pressing treatment at a temperature of 170° C. for 60 seconds to improve the unity between the base layer and the nanofiber layer in the laminate; thereby a laminate for separators was produced.

The properties of thus obtained laminate were measured or evaluated in the above method, and the obtained properties are shown in Table 2. Then the laminator was used as the separator, and the separator showed the properties as shown in Table 3.

In the above Table, PA and PET denote polyamide and polyethylene terephthalate, respectively. The drawn PET fibers had a fineness of 0.5 dtex, the meta-aramid fibers had an average fiber diameter of 500 nm, and the undrawn PET fibers had a fineness of 1.1 dtex.

TABLE 2

|  | Com. Ex. 1 | Com. Ex. 2 | Com. Ex. 3 | Com. Ex. 4 | Com. Ex. 5 |
|---|---|---|---|---|---|
| Nanofiber layer (A) | | | | | |
| Filament species | — | Cellulose | PA9T | — | PAN |
| Average fiber diameter (nm) | — | 450 | 340 | — | 270 |
| Basis weight (g/m²) | — | 3.9 | 3.9 | — | 3.1 |
| Thickness (μm) | — | 19 | 22 | — | 19 |
| Bulk density (g/cm³) | — | 0.21 | 0.18 | — | 0.16 |
| Porosity (%) | — | 86 | 84 | — | 85 |
| Base layer (or nonwoven fabric layer) (B) | | | | | |
| Fiber composition | | | | | |
| Subject fiber (Part by mass) | | | | | |
| PA9T (0.1dtex) | | 70 | | | |
| PA9T (0.7dtex) | | | | | |
| PA9T (0.005dtex) | 70 | | | | |
| Drawn PET fiber | | | 70 | | 70 |
| Meta-aramid fiber | | | | 70 | |

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Nanofiber layer (A) | | | | | | | | |
| Filament species | PA9T | PA9T | PA9T | PA9T | PA9T | PA9T | PA9T | PA9T |
| Average fiber diameter (nm) | 320 | 80 | 500 | 320 | 50 | 550 | 970 | 650 |
| Basis weight (g/m²) | 4.1 | 3.7 | 3.3 | 1.5 | 3.5 | 3.5 | 3.1 | 3.2 |
| Thickness (μm) | 22 | 24 | 15 | 9 | 24 | 15 | 11 | 13 |
| Bulk density (g/cm³) | 0.19 | 0.15 | 0.22 | 0.17 | 0.15 | 0.23 | 0.28 | 0.25 |
| Porosity (%) | 84 | 86 | 81 | 85 | 87 | 79 | 75 | 78 |
| Base layer (B) | | | | | | | | |
| Fiber composition | | | | | | | | |
| Subject fiber (Part by mass) | | | | | | | | |
| PA9T (0.1dtex) | 70 | 70 | 70 | | 70 | 70 | 70 | 70 |
| PA9T (0.7dtex) | | | | 70 | | | | |
| PA9T (0.005dtex) | | | | | | | | |
| Drawn PET fiber | | | | | | | | |
| Meta-aramid fiber | | | | | | | | |
| Binder fiber (Part by mass) | | | | | | | | |
| PA 9T/6IT | 30 | 30 | 30 | 30 | 30 | 30 | 30 | 30 |
| Undrawn PET fiber | | | | | | | | |
| Basis weight (g/m²) | 11.8 | 11.9 | 11.8 | 11.8 | 11.8 | 11.8 | 11.8 | 11.8 |
| Thickness (μm) | 25 | 24 | 29 | 25 | 25 | 25 | 30 | 25 |
| Bulk density (g/cm³) | 0.47 | 0.49 | 0.41 | 0.47 | 0.47 | 0.47 | 0.39 | 0.47 |
| Porosity (%) | 58 | 57 | 64 | 58 | 58 | 58 | 65 | 58 |
| Laminate or monolayer | | | | | | | | |
| Laminated morphology | A/B | A/B | A/B | A/B | A/B | A/B | A/B | A/B |
| Total basis weight (g/m²) | 15.9 | 15.7 | 15.1 | 14.8 | 15.3 | 15.3 | 14.9 | 15 |
| Thickness (μm) | 47 | 48 | 44 | 43 | 49 | 40 | 41 | 38 |
| Average pore size (μm) | 0.5 | 0.4 | 0.6 | 0.5 | 0.3 | 0.6 | 1.1 | 0.7 |
| Peeling strength (g/30 mm) | 10 | 10 | 12 | 9 | 10 | 11 | 10 | 10 |
| Electrolyte resistance | Good | Good | Good | Good | Good | Good | Good | Good |
| Heat resistance (shrinkage %) | 1.9 | 1.9 | 1.9 | 2.0 | 1.9 | 1.9 | 1.9 | 2.0 |

TABLE 2-continued

|  | Com. Ex. 1 | Com. Ex. 2 | Com. Ex. 3 | Com. Ex. 4 | Com. Ex. 5 |
|---|---|---|---|---|---|
| Binder fiber (Part by mass) | | | | | |
| PA 9T/6IT | 30 | 30 | | 30 | |
| Undrawn PET fiber | | | 30 | | 30 |
| Basis weight (g/m²) | 14.2 | 11.8 | 12.1 | 21.1 | 12.1 |
| Thickness (μm) | 32 | 24 | 21 | 42 | 21 |
| Bulk density (g/cm³) | 0.44 | 0.49 | 0.58 | 0.5 | 0.58 |
| Porosity (%) | 61 | 57 | 58 | 63 | 58 |
| Laminate or monolayer | | | | | |
| Laminated morphology | B | A/B | A/B | B | A/B |
| Total basis weight (g/m²) | 14.2 | 15.7 | 16 | 21.1 | 15.2 |
| Thickness (μm) | 32 | 43 | 43 | 42 | 40 |
| Average pore size (μm) | 1.9 | 0.6 | 0.5 | 1.1 | 0.6 |
| Peeling strength (g/30 mm) | — | 6 | 3 | — | 4 |
| Electrolyte resistance | Good | Good | Good | Good | Good |
| Heat resistance (shrinkage %) | 1.8 | Embrittled | 4.7 | 2.1 | 5.7 |

In the above Table, PA and PET denote polyamide and polyethylene terephthalate, respectively. The drawn PET fibers had a fineness of 0.5 dtex, the meta-aramid fibers had an average fiber diameter of 500 nm, and the undrawn PET fibers had a fineness of 1.1 dtex.

TABLE 3

| Capacitor property | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 | Com. Ex. 5 |
|---|---|---|---|---|---|---|---|---|---|---|---|
| Electric leakage (μA) | 10 (A) | 8 (A) | 53 (B) | 30 (A) | 7 (A) | 87 (B) | 20 (A) | — | — | 30 (A) | — |
| Internal resistance (Ω) | 1.7 (B) | 1.9 (B) | 1.5 (A) | 1.2 (A) | 1.9 (B) | 1.2 (A) | 3.2 (C) | — | — | 2.6 (C) | — |
| Evaluation | (B) | (B) | (B) | (A) | (B) | (B) | (C) | — | — | (C) | — |

As shown in the results of the above Tables 1 and 2, the laminates obtained in Examples 1 to 8 were made of the nanofiber layer of the polyamide 9T belonging to the polyamide (a) and the base layer comprising the fibers at least comprising the polyamide (a) fibers, and in particular, the nanofiber layer was placed on one surface or both surfaces of the base layer formed from mixed fibers of the polyamide (a) fiber and the polyamide (ab) blend fiber (binder fiber). As a result, the laminates are excellent in heat resistance, and resistant to reduction in physical property and performance even when heated during drying or processing. Further, the laminates are excellent in electrolyte resistance, and have a high peeling strength because of the strong bonding between the nanofiber layer and the base layer.

Furthermore, when the laminates obtained in Examples 1 to 6 comprising the nanofiber layers, each of the layer having an average fiber diameter of 10 to 600 nm, were used as the separator, the separators excel in shielding property thereof from electrode materials detached from positive and/or negative electrodes, while being excellent in property of passing the electrolyte therethrough. Accordingly, in the case where these separators were employed in the electric double layer capacitor, the capacitors can have a high performance by avoiding generation of leakage current and having a reduced internal resistance.

In contrast, as shown in the above Table 2, the separator of Comparative Example 1 did not contain the nanofiber layer of the polyamide 9T nanofilaments, but consisted of the single layer of the wet-laid nonwoven fabric formed from the mixed fibers of the fibrillated polyamide 9T fibers (subject fibers) and the polyamide (ab) blend fibers (binder fibers). The separator has high resistance due to its low porosity and fails to smooth pass of the electrolyte therethrough, and cannot contribute to obtain an electric double layer capacitor having a good performance.

Moreover, in the laminate for the separator obtained in Comparative Example 2, the nanofiber layer was not formed from the polyamide (a) fibers but formed from the cellulose nanofilaments. As a result, the laminate is deteriorated in heat resistance and has a significant dimensional change during the heat treatment, and cannot be effectively usable as separators for capacitors.

Further, in the laminate for the separator obtained in Comparative Example 3, the base layer was not formed from the fibers containing the polyamide (a) fiber, but formed from the PET fibers. As a result, the base layer is not strongly bonded to the nanofiber layer of the polyamide (a) nanofilaments, deteriorated in adhesive strength. Further, the laminate is poor in heat resistance and cannot be effectively used as the separator for capacitors because shrinkage of the separator caused by the heat treatment generates the contact between electrodes.

The separator of Comparative Example 4 did not contain the nanofiber layer of the polyamide 9T nanofilaments, but consisted of the single layer of the wet-laid nonwoven fabric formed from the mixed fibers of the fibrillated meta-aramid fibers (subject fibers) and the polyamide (ab) blend fibers (binder fibers). As a result, the separator has a low porosity, and fails to ensure enough contact area with fine particles. Moreover, the separator has a high resistance due to the low porosity, and fails to pass electrolyte smoothly in the separator. Such a separator cannot contribute to a good performance of the capacitor.

In the separator of Comparative Example 5, since the nanofiber layer was formed from the polyacrylonitrile nanofilaments, the separator is deteriorated in heat resistance and has the large dimensional change during the heat treatment. Further, the separator does not have an enough peeling strength required in the laminate, and is deteriorated in durability. Furthermore, the separator cannot effectively used as the separator for the capacitor because shrinkage of the separator caused by the heat treatment generates the contact between electrodes.

It should be noted that in the case where the laminates of Examples 7 and 8 were used as the separators, both of the separators showed a low internal resistance of 1.1Ω. However, probably because these laminates had an average fiber diameter of 970 nm and 650 nm, respectively, the separator of Example 7 generated leakage current of 112 μA, and the separator of Example 8 generated leakage current of 102 μA. Accordingly, these laminates cannot satisfy both reducing internal resistance and avoiding generation of leakage current.

Industrial Applicability

The laminate of the present invention is excellent in heat resistance. Further, the laminate is excellent in collecting property of fine particles (e.g., powder dusts, electrode materials) due to uniformly distributed micropores over the entire nanofiber layer as well as a high porosity of the nanofiber layer. Such laminate is preferably applicable to secondary batteries (e.g., lithium-ion secondary battery) or separators for capacitors, filtering medium for filters, or the like.

What is claimed is:

1. A separator for capacitors comprising a laminate comprising a nanofiber layer and a base layer, the laminate at least comprising the nanofiber layer on one surface or both surfaces thereof;

the nanofiber layer comprising polyamide filaments formed from a polyamide (a) and having an average fiber diameter of 10 to 600 nm, and the base layer comprising fibers at least including polyamide fibers formed from a polyamide (a); and the polyamide (a) comprising a dicarboxylic acid unit and a diamine unit, (i) the dicarboxylic acid unit comprising a terephthalic acid unit in the proportion of not lower than 60% by mole, and (ii) the diamine unit comprising at least one diamine unit selected from the group consisting of 1,9-nonanediamine unit and 2-methyl-1,8-octanediamine unit in the proportion of not lower than 60% by mole in total, wherein the nanofiber layer has a basis weight of 0.1 to 5 g/m$^2$, and the ratio of base layer thickness to nanofiber layer thickness is 0.8:1 to 3.5:1.

2. The separator for capacitors as claimed in claim 1, wherein the laminate has a peeling strength between the nanofiber layer and the base layer of 5 to 100 g/30 mm.

3. The separator for capacitors as claimed in claim 1, wherein the base layer comprises the polyamide (a) fibers comprising the polyamide (a) and polyamide (ab) fibers formed from a polyamide (ab) including a polyamide (a) and a polyamide (b), the polyamide (b) comprising a dicarboxylic acid unit and a diamine unit, (i) the dicarboxylic acid unit comprising at least one dicarboxylic acid unit selected from the group consisting of terephthalic acid unit and isophthalic acid unit in the proportion of not lower than 60% by mole in total, and (ii) the diamine unit comprising at least one diamine unit selected from the group consisting of 2,2,4-trimethylhexanediamine unit, 2,4,4-trimethylhexanediamine unit and 1,6-hexanediamine unit in the proportion of not lower than 60% by mole in total.

4. The separator for capacitors as claimed in claim 1, wherein the nanofiber layer has a porosity of 65% to 95%.

5. The separator for capacitors as claimed in claim 1, wherein the fibers constituting the base layer have a single-fiber fineness of 0.01 to 5.0 dtex.

6. The separator for capacitors as claimed in claim 1, wherein the nanofiber layer comprising the polyamide filaments comprising the polyamide (a) and having an average fiber diameter of 10 to 600 nm is laminated on the base layer using an electro-spinning with a solution of the polyamide (a) in an organic solvent or with a molten liquid of the polyamide (a).

7. A capacitor comprising a separator for capacitors, the separator is recited in claim 1.

8. The separator for capacitors as claimed in claim 1, wherein the nanofiber layer has a basis weight of 0.2 to 5 g/m$^2$.

9. A heat-resistant laminate comprising a nanofiber layer and a base layer, the laminate at least comprising the nanofiber layer on one surface or both surfaces thereof;

the nanofiber layer comprising polyamide filaments formed from a polyamide (a) and having an average fiber diameter of 10 to 1000 nm, and the base layer comprising fibers at least including polyamide fibers formed from a polyamide (a); and the polyamide (a) comprising a dicarboxylic acid unit and a diamine unit, (i) the dicarboxylic acid unit comprising a terephthalic acid unit in the proportion of not lower than 60% by mole, and (ii) the diamine unit comprising at least one diamine unit selected from the group consisting of 1,9-nonanediamine unit and 2-methyl-1,8-octanediamine unit in the proportion of not lower than 60% by mole in total, wherein the nanofiber layer has a basis weight of 0.1 to 5 g/m$^2$, and the ratio of base layer thickness to nanofiber layer thickness is 0.8:1 to 3.5:1.

10. The heat-resistant laminate as claimed in claim 9, wherein the laminate has a rate of dimensional change of less than 2.5% when the rate is measured before and after heating in a dryer kept at a temperature of 200° C. under a vacuum atmosphere for 24 hours.

11. The heat-resistant laminate as claimed in claim 9, wherein the nanofiber layer has a basis weight of 0.2 to 5 g/m$^2$.

* * * * *